(12) United States Patent
Tanaka

(10) Patent No.: US 8,929,184 B2
(45) Date of Patent: Jan. 6, 2015

(54) OPTICAL DISK DEVICE WITH INDEPENDENT SERVO LAYER FOCUS AND TRACKING CONTROL ON A MULTILAYERED DISC

(75) Inventor: Yukinobu Tanaka, Tokyo (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 14/114,156

(22) PCT Filed: Mar. 5, 2012

(86) PCT No.: PCT/JP2012/001481
§ 371 (c)(1),
(2), (4) Date: Oct. 25, 2013

(87) PCT Pub. No.: WO2012/147260
PCT Pub. Date: Nov. 1, 2012

(65) Prior Publication Data
US 2014/0078875 A1    Mar. 20, 2014

(30) Foreign Application Priority Data

Apr. 28, 2011  (JP) .................................. 2011-100389

(51) Int. Cl.
| | |
|---|---|
| *G11B 7/00* | (2006.01) |
| *G11B 7/085* | (2006.01) |
| *G11B 7/09* | (2006.01) |
| *G11B 7/095* | (2006.01) |
| *G11B 7/1275* | (2012.01) |
| *G11B 7/1392* | (2012.01) |

(52) U.S. Cl.
CPC .......... *G11B 7/08505* (2013.01); *G11B 7/0938* (2013.01); *G11B 7/0953* (2013.01); *G11B 7/0956* (2013.01); *G11B 7/1275* (2013.01); *G11B 7/13925* (2013.01); *G11B 2007/0013* (2013.01)

USPC ........................................................ 369/44.37

(58) Field of Classification Search
None
See application file for complete search history.

(56) References Cited

U.S. PATENT DOCUMENTS

| | | | |
|---|---|---|---|
| 2009/0147660 A1* | 6/2009 | Saito et al. ............... | 369/112.23 |
| 2009/0303849 A1 | 12/2009 | Nakatani et al. | |
| 2010/0172228 A1* | 7/2010 | Saito et al. ............... | 369/112.03 |
| 2010/0309759 A1 | 12/2010 | Sato et al. | |
| 2012/0250482 A1* | 10/2012 | Ogata ........................ | 369/53.28 |

FOREIGN PATENT DOCUMENTS

| | | | |
|---|---|---|---|
| JP | 2008-097694 A | | 4/2008 |
| JP | 2008097694 A | * | 4/2008 |
| JP | 2009-163811 A | | 7/2009 |
| JP | 2010-040093 A | | 2/2010 |
| WO | 2008/099707 A1 | | 8/2008 |
| WO | 2009/037773 A1 | | 3/2009 |

OTHER PUBLICATIONS

International Search Report issued in International Patent Application No. PCT/JP2012/001481 dated May 22, 2012.
M. Ogasawara et al., "16 layers Write Once Disc with a Separated Guide Layer," ISOM2010, Th-L-07.

* cited by examiner

*Primary Examiner* — Brenda Bernardi
(74) *Attorney, Agent, or Firm* — McDermott Will & Emery LLP

(57) ABSTRACT

There is a problem that when the relative angle between laser light and an optical disc is changed by temperature, or a chucking state of an optical disc and so forth, the formerly recorded data is overwritten. The above-mentioned problem is solved by performing focus control and tracking control independently with respect to a servo layer and a recording layer in a grooveless disc.

9 Claims, 9 Drawing Sheets

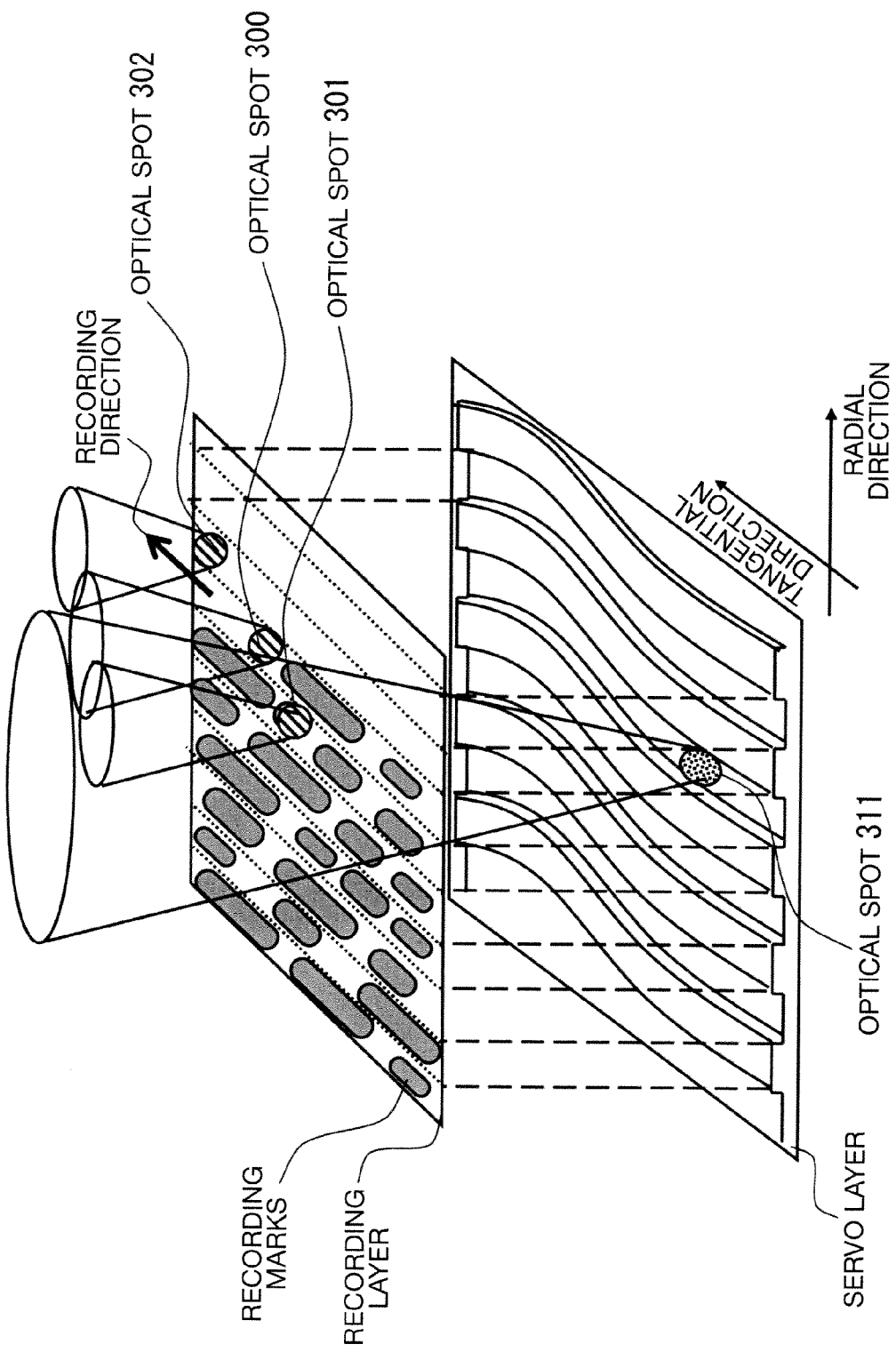

OPTICAL DISK DEVICE WITH INDEPENDENT SERVO LAYER FOCUS AND TRACKING CONTROL ON A MULTILAYERED DISC

RELATED APPLICATIONS

This application is the U.S. National Phase under 35 U.S.C. §371 of International Application No. PCT/JP2012/001481, filed on Mar. 5, 2012, which in turn claims the benefit of Japanese Application No. 2011-100389, filed on Apr. 28, 2011, the disclosures of which Applications are incorporated by reference herein.

TECHNICAL FIELD

The present invention relates to an optical disc device for reproducing information from an optical disc, or recording or reproducing information into an optical disc, using laser light.

BACKGROUND ART

In recent years, in optical discs of the Blu-ray Disc™ standard, an optical disc including three or four recording layers has been developed and standardized in order to increase the recording capacity. Moreover, it is expected that the development of a four-or-more recording-layer optical disc will be performed from now on with an objective of implementing even larger capacity. For example, in Non-Patent Literature 1, the description has been given concerning the following optical disc (i.e. grooveless disc): Namely, in this grooveless disc, there is provided a layer (which, hereinafter, will be referred to as a servo layer) that is equipped with a physical groove structure for performing the tracking servo control. Furthermore, there are provided layers for performing recording/reproduction ("recording layers") that are equipped with none of the land/groove structure. It is considered that this grooveless disc is easy to fabricate even if a large number of recording layers are to be multilayered.

Also, in the abstract of Patent Literature 1, the disclosure has been made as follows: "An additional-writing start position is detected which is continuous to the formerly-recorded area in one of the recording layers of a guide-layer-separated-type optical recording medium. At the time of starting the additional recording, the irradiation spot of a servo-use first laser beam is displaced to the position on a guide track which is directly opposed to a position in the recording layer that is apart from the additional-writing start position onto the unrecorded-area side. The irradiation spot of a recording-or-reproduction-use second laser beam onto the recording layer is displaced in a follow-up manner by this first laser's irradiation-spot displacement. The additional recording into the recording layer is started from the irradiation-spot position of the second laser beam after this follow-up displacement is over."

CITATION LIST

Patent Literature

PATENT LITERATURE 1: JP-A-2010-40093

Non-Patent Literature

NON-PATENT LITERATURE 1: M. Ogasawara et al., "16 Layers Write Once Disc with a Separated Guide Layer", ISOM2010, Th-L-07

SUMMARY OF INVENTION

Technical Problem

As one of the problems when the additional recording is performed into a grooveless disc as described above, there exist the following dangers: Namely, if the relative angle between each laser beam and this optical disc is changed by such a factor as temperature or optical disc's chucking state, there exists a danger that previously-recorded data will be overwritten. Also, in a rewritable grooveless disc, if the relative angle between each laser beam and this optical disc is changed, there exists a danger that a recording position different from the desired recording position will erroneously be overwritten by new data.

In Patent Literature 1, the disclosure has been made regarding the additional recording. In this literature, the additional recording is started with an interval from the finally-recorded position of the formerly-recorded area. This structure makes it possible to suppress the additional recording from being performed in the manner of being overlapped with the formerly-recorded area. This suppression is made possible, even if, as illustrated in FIG. 6, a tilt (i.e. an inclination) of the optical disc with respect to the optical axis of each laser beam exists due to such a factor as optical disc's time-lapse-based warp, or difference in the recording devices.

In the solving method of Patent Literature 1, however, the wasted area is formed every time the additional recording is performed. As a result, there exists a problem that this results in a lowering in the disc capacity.

Accordingly, an object of the present invention is to provide an optical disc device that allows the recording to be performed at an appropriate and proper position of the grooveless disc.

Solution to Problem

The above-described problem is solved by the invention disclosed in the appended claims, for example.

Advantageous Effects of Invention

According to the present invention, it becomes possible to provide the optical disc device that allows the recording to be performed at an appropriate and proper position of the grooveless disc.

BRIEF DESCRIPTION OF DRAWINGS

FIG. 9 illustrates the relationships among the optical spots that are focused onto a recording layer and the servo layer at the recording time.

DESCRIPTION OF EMBODIMENTS

Figure 1:
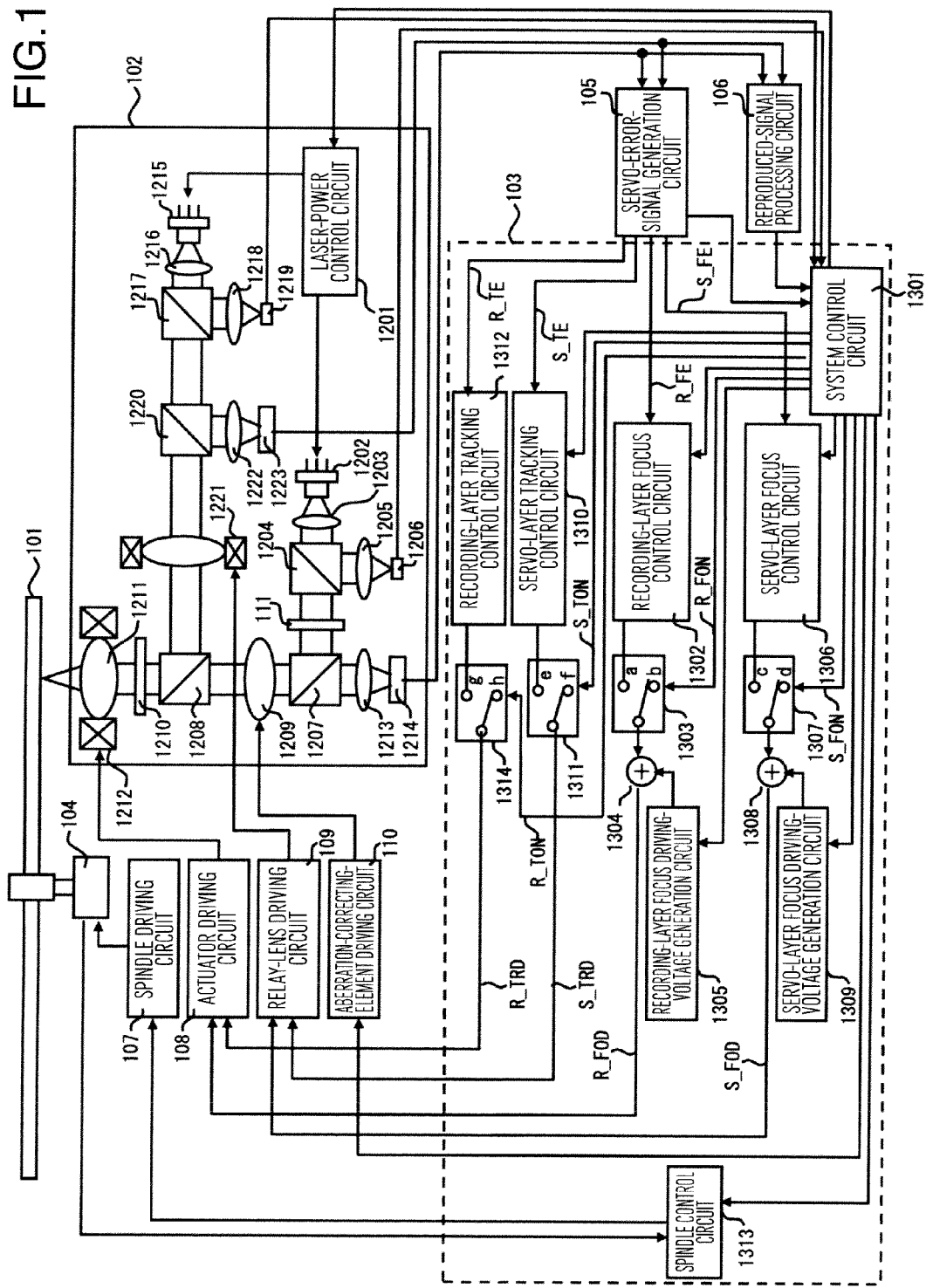
FIG. 1 is a configuration diagram for illustrating an optical disc device of Embodiment 1 to Embodiment 2.

Hereinafter, referring to the drawings, the explanation will be given below concerning embodiments for carrying out the present invention. Also, the configuration that will be explained here indicates just examples of the embodiments. Namely, the present invention is not limited to the embodiments.

Embodiment 1

Hereinafter, the explanation will be given below concerning Embodiment 1 of the present invention.
(Disc Structure)

Figure 2:
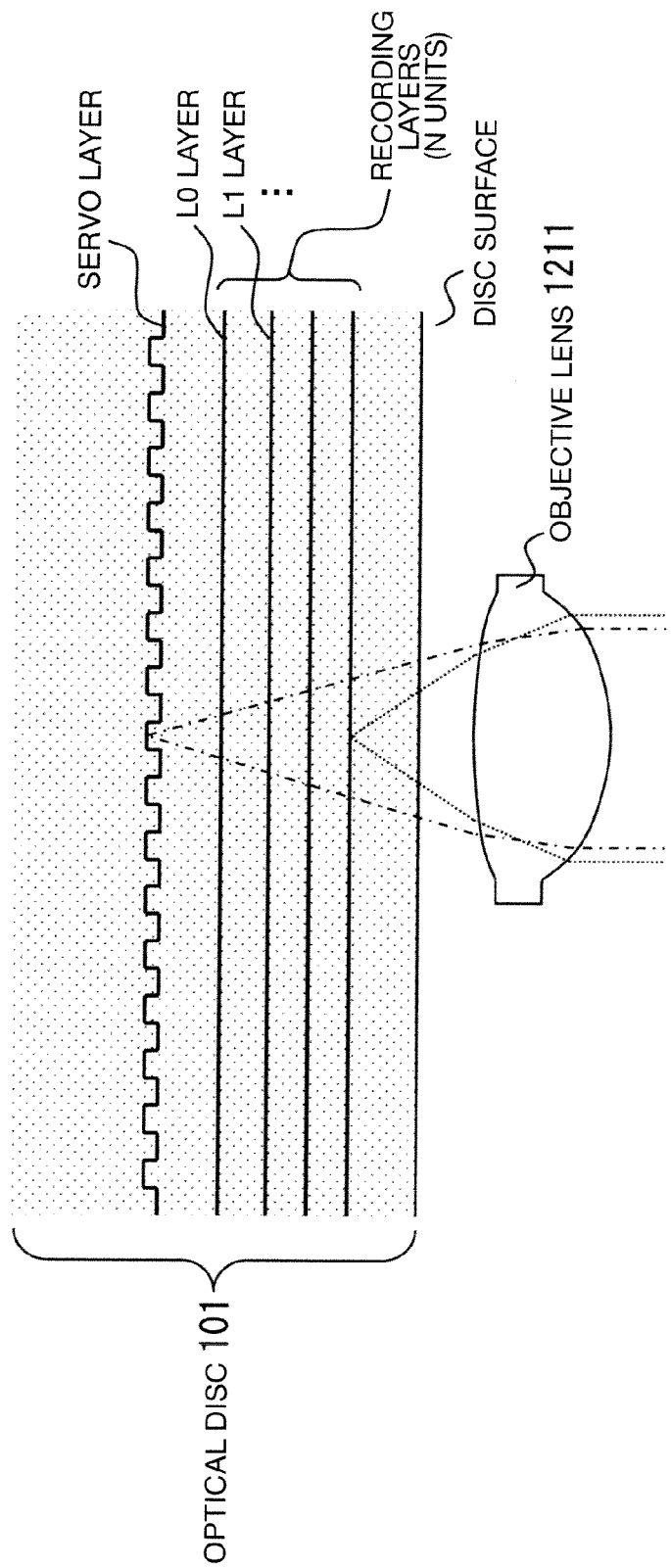
FIG. 2 illustrates the structure of an optical disc.

FIG. 2 illustrates the structure (i.e. cross section) of an optical disc that is employed as the target in the present embodiment. A reference numeral 101 on the present drawing denotes the following optical disc: Namely, this optical disc 101 includes a single servo layer where grooves are formed, and a single recording layer or a plurality of recording layers. Here, each recording layer is equipped with none of the grooves, and thus it is a flat layer. As is the case with the grooves seen in the disc such as DVD or BD, the grooves of the servo layer are spiral grooves with the disc's rotation axis positioned at its center.

Also, a reference numeral 1211 on the present drawing denotes an objective lens of an (not-illustrated) optical disc device for focusing laser light onto the optical disc 101. The present drawing illustrates the following situation: Namely, two different light fluxes pass through the objective lens 1211. Of these light fluxes, one light flux is focused onto the servo layer of the optical disc 101; whereas the other light flux is focused onto one of the plurality of recording layers of the optical disc 101. The optical disc employed as the target in the present embodiment performs the recording or reproduction by using the two light fluxes in this way, or by using two or more light fluxes.

Features of the Present Embodiment

Figure 3:
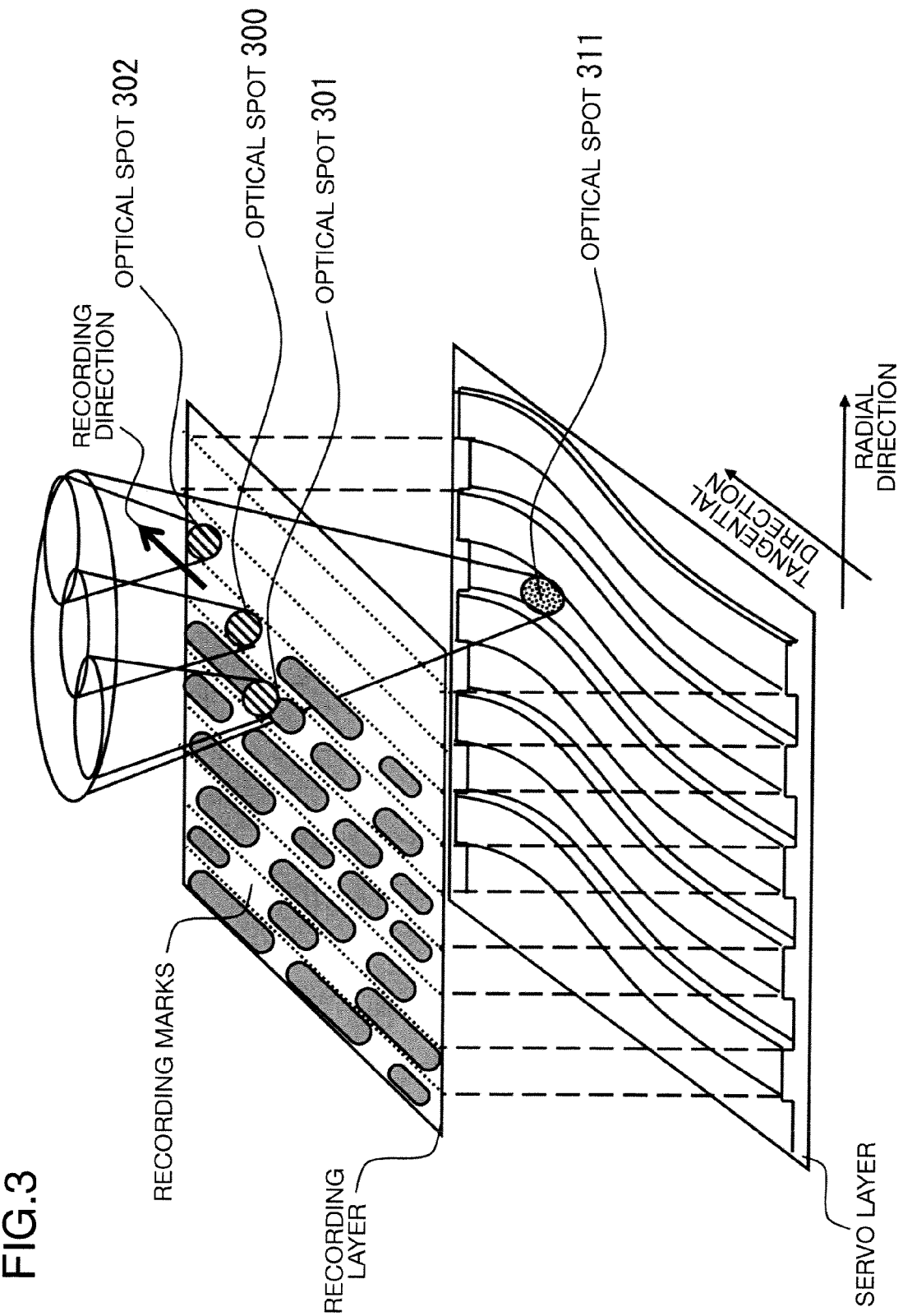
FIG. 3 illustrates the relationships among optical spots that are focused onto a recording layer and a servo layer at the recording time.

Referring to FIG. 3, the explanation will be given below concerning the features of the present embodiment. FIG. 3 illustrates a partial portion of the optical disc, which has the structure illustrated in FIG. 2, is cut out and enlarged.

FIG. 3 illustrates the following situation: Namely, an optical spot 300 is focused onto one of the recording layers. This optical spot 300 is now recording a mark while travelling in the tangential direction of the optical disc 101. Simultaneously, an optical spot 301 and an optical spot 302 are respectively focused onto a formerly-recorded area's recording mark and an area (i.e. unrecorded area) onto which a mark is supposed to be recorded later. At this time, the optical spots 301 and 302 are maintained at a constant distance (i.e. spacing) from the optical spot 300. Moreover, an optical spot 311 is focused onto a groove (i.e. track) of the servo layer, which is positioned substantially directly below the optical spot 300. Incidentally, the optical spots 300, 301, and 302 are split from the same light flux originally, and are emitted through a single (not-illustrated) objective lens. Meanwhile, the optical spot 311 is a light flux that is different from the optical spots 300, 301, and 302, but is emitted through the same objective lens as the objective lens through which these optical spots are emitted.

The features of the present embodiment are the following points. Namely, the operations such as CLU control and recording-timing generation at the recording time are performed based on the information acquired from the servo groove. Meanwhile, if formerly-recorded marks exist on the recording layer, the tracking is controlled so that the optical spot 301 will trace and follow the formerly-recorded marks. This tracking control makes it possible to fixedly determine the position of the optical spot 300 in the disc's radial direction. Subsequently, while fixedly determining the position of the optical spot 300 in this direction, a mark is recorded onto the recording layer.

In the tracking control method in accordance with the present embodiment like this, the train (i.e. track) of the formerly-recorded marks is recoded with a constant spacing placed between these recording marks in the disc's radial direction. This configuration makes it possible to suppress the overwriting of a mark over the train of the formerly-recorded marks. Incidentally, this type of overwriting was a problem in the conventional methods, where the tracking is controlled by always taking advantage of the groove of the servo layer regardless of the recording state of the recording layer.

The focus control and the tracking control are performed over the servo layer and each recording layer independently by driving actuators independently. The effects acquired from this configuration are the following points: Namely, it becomes possible to suppress a formerly-recorded area from being overwritten-recorded, even if a tilt (i.e. inclination) of the optical disc with respect to the optical axis of the two laser beams exists due to such a factor as optical disc's time-lapse-based warp, or difference in the recording devices. Also, it becomes possible to suppress a formerly-recorded area from being overwritten-recorded, even if the tilt (i.e. inclination) of the optical disc with respect to the optical axis of the two laser beams exists due to such a factor as not only the optical disc's time-lapse-based warp, but also optical disc's warp of its own, or in-layer deviation between the servo layer and each recording layer.

Implementation Method for the Present Embodiment

FIG. 1 illustrates an example of the optical disc device for carrying out the above-described tracking control in accordance with the present embodiment.

The optical disc device illustrated in FIG. 1 is constituted from the following configuration components: an optical pickup 102, a signal processing circuit 103, a spindle motor 104, a servo-error-signal generation circuit 105, a reproduced-signal processing circuit 106, a spindle driving circuit 107, an actuator driving circuit 108, a relay-lens driving circuit 109, and an aberration-correcting-element driving circuit 110.

Also, the signal processing circuit 103, which is a circuit for performing various types of signal processing of the optical disc device, operates with an electric potential Vref used as its reference. The signal processing circuit 103 is constituted from the following configuration components: a system control circuit 1301, a recording-layer focus control circuit 1302, a switch 1303, an adder 1304, a recording-layer focus driving-voltage generation circuit 1305, a servo-layer focus control circuit 1306, a switch 1307, an adder 1308, a servo-layer focus driving-voltage generation circuit 1309, a servo-layer tracking control circuit 1310, a switch 1311, a recording-layer tracking control circuit 1312, a switch 1314, and a spindle control circuit 1313.

The optical disc 101 is rotated at a prescribed speed of rotation by the spindle motor 104. The spindle motor 104 is controlled by the spindle control circuit 1313 that receives an instruction signal from the system control circuit 1301 installed on the signal processing circuit 103. A signal outputted from the spindle control circuit 1313 is amplified by the spindle driving circuit 107. Then, the amplified signal is supplied to the spindle motor 104.

In this way, the spindle control circuit 1313 in the present embodiment performs the control over the spindle motor 104 as follows: Namely, based on an output signal from the spindle motor 104, it is rotated at a prescribed speed of rotation regardless of the radial position of the optical disc 101. Incidentally, the rotation scheme like this is referred to as the CAV control.

The optical pickup 102 includes two optical systems whose wavelengths are different from each other, such as, for example, 405 nm and 650 nm First, the explanation will be given below regarding the 405-nm-wavelength optical system. A laser-power control circuit 1201, which is controlled by the system control circuit 1301, outputs a driving current for driving a laser diode 1202. Here, a-few-hundreds-of-MHz radio-frequency wave's superposition is applied to this driving current in order to suppress the laser noise. The laser diode 1202 emits 405-nm-wavelength laser light whose waveform corresponds to that of this driving current. The emitted laser light is caused to become parallel laser light by a collimator lens 1203. Then, a partial component of this parallel laser light is reflected by a beam splitter 1204, then being focused onto a power monitor 1206 by a focusing lens 1205. The power monitor 1206 feeds back, to the system control circuit 1301, the current or voltage corresponding to the intensity of this laser light. This feedback allows the intensity of the laser light, which is to be focused onto the recording layer of the optical disc 101, to be maintained at a desired value such as, for example, 2 mW. Meanwhile, the laser light which has passed through the beam splitter 1204 is caused to become a plurality of light beams (i.e. 0-order light's main beam and its ±1st-order lights' servo beams) by a three-beam grating 111. Moreover, these light beams are reflected by a polarization beam splitter 1207. These reflected light beams, whose convergences/divergences are controlled by an aberration-correcting element 1209 driven by the aberration-correcting-element driving circuit 110, pass through a dichroic mirror 1208. Here, the dichroic mirror 1208 is an optical element for reflecting light of a specific wavelength, and permitting light of the other wavelengths to pass therethrough. It is assumed here that the dichroic mirror 1208 reflects the 650-nm-wavelength light, and permits 405-nm-wavelength light to pass therethrough. Furthermore, the laser light beams, which have passed through the dichroic mirror 1208, are caused to become circularly-polarized light beams by a quarterwave plate 1210, then being focused onto the recording layer of the optical disc 101 by the objective lens 1211. Here, the position of the objective lens 1211 is controlled by an actuator 1212. Subsequently, the laser light beams, which have been reflected by the optical disc 101, are modulated in their intensities in correspondence with the information recorded into the optical disc 101, then being caused to become linearly-polarized light beams by the quarterwave plate 1210. The laser light beams then pass through the polarization beam splitter 1207 via the dichroic minor 1208 and the aberration-correcting element 1209. In addition, the laser light beams, which have passed through the polarization beam splitter 1207, are focused onto a detector 1214 by a focusing lens 1213. The detector 1214 detects the intensities of the laser light beams, then outputting signals corresponding thereto to the servo-error-signal generation circuit 105 and the reproduced-signal processing circuit 106.

The servo-error-signal generation circuit 105 generates the following error signals from the signals outputted from the detector 1214 and a detector 1223: a recording-layer focus error signal (hereinafter, R_FE signal) used for the focus control over the recording layer, a servo-layer focus error signal (hereinafter, S_FE signal) used for the focus control over the servo layer, a recording-layer tracking error signal (hereinafter, R_TE signal) used for the tracking control over the recording layer, and a servo-layer tracking error signal (hereinafter, S_TE signal) used for the tracking control over the servo layer. It is assumed that each error signal is outputted with the electric potential Vref used as its reference.

The focus control and the tracking control in the 405-nm-wavelength optical system are performed on the recording layer (i.e. any one layer of the plurality of recording layers).

Based on an instruction signal outputted from the system control circuit 1301, the recording-layer focus control circuit 1302 performs compensations for the gain and phase of the R_FE signal. Moreover, the control circuit 1302 outputs a driving signal for performing the focus control over the recording layer. The driving signal outputted from the recording-layer focus control circuit 1302 is inputted into the actuator driving circuit 108 via the switch 1303 and the adder 1304.

Based on an R_FON signal outputted from the system control circuit 1301, the switch 1303 selects and outputs either the output signal from the recording-layer focus control circuit 1302, or the reference electric potential Vref. If High level is inputted as the R_FON signal, the switch 1303 selects its terminal a. As a result, the output signal from the recording-layer focus control circuit 1302 is outputted to the actuator driving circuit 108 via the adder 1304. Meanwhile, if Low level is inputted as the R_FON signal, the switch 1303 selects its terminal b, thereby outputting the reference electric potential Vref.

As a consequence, the R_FON signal becomes a signal for instructing the ON/OFF of the focus control over the recording layer. Also, the switch 1303 functions as a switch for switching the ON/OFF of the focus control over the recording layer. The focus control over the recording layer is switched ON by the R_FON signal's being switched from Low level to High level. This operation is referred to as focus pull-in operation.

Based on an instruction signal outputted from the system control circuit 1301, the recording-layer focus driving-voltage generation circuit 1305 outputs a prescribed voltage. The recording-layer focus driving-voltage generation circuit 1305 outputs, for example, the sweep voltage in focus sweep operation or the jump voltage at the time of focus jump.

The output signal from the recording-layer focus driving-voltage generation circuit 1305 and the output signal from the switch 1303 are added to each other by the adder 1304. Then, the resultant is outputted to the actuator driving circuit 108 as an R_FOD.

In accordance with the R_FOD, the actuator 1212 is driven in a direction that is vertical to the disc surface of the optical disc 101. This driving causes the objective lens 1211 to be driven in the direction vertical to the disc surface.

Next, the explanation will be given below regarding the 650-nm-wavelength optical system. As is the case with the 405-nm-wavelength optical system, the laser-power control circuit 1201 drives a laser diode 1215. The laser diode 1215 emits 650-nm-wavelength laser light. The power of a partial component of the laser light is monitored by a power monitor 1219 via a collimator lens 1216, a beam splitter 1217, and a focusing lens 1218. The power monitored is fed back to the system control circuit 1301. This feedback allows the intensity of the laser light, which is to be focused onto the servo layer of the optical disc 101, to be maintained at a desired power such as, for example, 3 mW. Meanwhile, the laser light which has passed through the beam splitter 1217 passes through a polarization beam splitter 1220. Here, the convergence/divergence of the laser light is controlled by a relay lens 1221. Moreover, the laser light, which has passed through the relay lens 1221, is reflected by the dichroic mirror 1208. The reflected laser light is then focused onto the servo layer of the optical disc 101 by the objective lens 1211. Furthermore, the laser light, which has been reflected by the optical disc 101, is reflected by the polarization beam splitter 1220. Finally, the reflected laser light is focused onto the detector 1223 by a focusing lens 1222.

The focus control and the tracking control in the 650-nm-wavelength optical system are performed on the servo layer.

Based on an instruction signal outputted from the system control circuit 1301, the servo-layer focus control circuit 1306 performs compensations for the gain and phase of the S_FE signal. Moreover, the control circuit 1306 outputs a driving signal for performing the focus control over the servo layer. The driving signal is inputted into the relay-lens driving circuit 109 via the switch 1307 and the adder 1308. This operation allows the execution of the focus control over the servo layer.

Based on an S_FON signal outputted from the system control circuit 1301, the switch 1307 selects and outputs either the output signal from the servo-layer focus control circuit 1306, or the reference electric potential Vref. If High level is inputted as the S_FON signal, the switch 1307 selects its terminal c. Meanwhile, if Low level is inputted as the S_FON signal, the switch 1307 selects its terminal d, thereby outputting the reference electric potential Vref.

As a consequence, the S_FON signal becomes a signal for instructing the ON/OFF of the focus control over the servo layer. Also, the switch 1307 functions as a switch for switching the ON/OFF of the focus control over the servo layer. The focus control over the servo layer is switched ON by the S_FON signal's being switched from Low level to High level. This operation is referred to as focus pull-in operation.

Based on an instruction signal outputted from the system control circuit 1301, the servo-layer focus driving-voltage generation circuit 1309 outputs a prescribed voltage. The servo-layer focus driving-voltage generation circuit 1309 outputs, for example, the sweep voltage in focus sweep operation.

The output signal from the servo-layer focus driving-voltage generation circuit 1309 and the output signal from the switch 1307 are added to each other by the adder 1308. Then, the resultant is outputted to the relay-lens driving circuit 109 as a S_FOD.

In accordance with the S_FOD, the relay lens 1221 is driven so that the position of the 650-nm-wavelength optical spot is controlled in a direction that is vertical to the disc surface of the optical disc 101. For example, in the case of FIG. 1, in order to drive the 650-nm-wavelength optical spot in the direction vertical to the disc surface of the optical disc 101, it is advisable to drive the relay lens 1221 in a direction that is horizontal to the disc surface. The present invention, however, is not limited to this configuration. Namely, the following configuration of the optical pickup 102 is also allowable: Namely, in order to control the position of the 650-nm-wavelength optical spot in the direction vertical to the disc surface of the optical disc 101, the relay lens 1221 is driven into the direction vertical to the disc surface.

The relay-lens driving circuit 109 drives the relay lens 1221 installed inside the optical pickup 102. This driving allows the focus control and the tracking control to be performed over the servo layer.

The relay-lens driving circuit 109 and the servo-layer focus control circuit 1306 operate as described earlier. This operation allows the focus control over the servo layer to be performed in accordance with the following manner: Namely, the 650-nm-wavelength laser spot, with which the optical disc 101 is irradiated, is always focused on the surface of the servo layer of the optical disc 101.

Here, High level and Low level of the R_FON signal and the S_FON signal are not necessarily required to be in the states described earlier. For example, it is also allowable to control the switch so that the switch selects the terminal a when the R_FON signal is at Low level.

Next, the explanation will be given below concerning the tracking control over the servo layer in the present embodiment.

Based on an instruction signal outputted from the system control circuit 1301, the servo-layer tracking control circuit 1310 performs compensations for the gain and phase of the servo-layer tracking error signal (hereinafter, S_TE signal). Moreover, the control circuit 1310 outputs a driving signal for performing the tracking control over the servo layer. The driving signal outputted from the servo-layer tracking control circuit 1310 is inputted into the relay-lens driving circuit 109 via the switch 1311.

Based on a S_TON signal outputted from the system control circuit 1301, the switch 1311 selects and outputs either the output signal from the servo-layer tracking control circuit 1310, or the reference electric potential Vref. Moreover, the switch 1311 outputs the resultant to the relay-lens driving circuit 109 as a tracking driving signal, S_TRD. If High level is inputted as the S_TON signal, the switch 1311 selects its terminal e. As a result, the output signal from the servo-layer tracking control circuit 1310 is outputted to the relay-lens driving circuit 109. Meanwhile, if Low level is inputted as the S_TON signal, the switch 1311 selects its terminal f, thereby outputting the reference electric potential Vref.

As a consequence, the S_TON signal becomes a signal for instructing the ON/OFF of the tracking control. Also, the switch 1311 functions as a switch for switching the ON/OFF of the servo-layer tracking control. The servo-layer tracking control is switched ON by the S_TON signal's being switched from Low level to High level. This operation is referred to as servo-layer track pull-in operation.

Next, the explanation will be given below concerning the tracking control over the recording layer in the present embodiment.

Based on an instruction signal outputted from the system control circuit 1301, the recording-layer tracking control circuit 1312 performs compensations for the gain and phase of the recording-layer tracking error signal (hereinafter, R_TE signal) and outputs a driving signal for performing the tracking control. The driving signal outputted from the recording-layer tracking control circuit 1312 is inputted into the actuator driving circuit 108 via the switch 1314.

Based on a R_TON signal outputted from the system control circuit 1301, the switch 1314 selects either the output signal from the recording-layer tracking control circuit 1312, or the reference electric potential Vref and outputs to the actuator driving circuit 108 as a tracking driving signal (hereinafter, R_TRD). If High level is inputted as the R_TON signal, the switch 1314 selects its terminal g. As a result, the output signal from the recording-layer tracking control circuit 1312 is outputted to the actuator driving circuit 108. Meanwhile, if Low level is inputted as the R_TON signal, the switch 1314 selects its terminal h, thereby outputting the reference electric potential Vref.

As a consequence, the R_TON signal becomes a signal for instructing the ON/OFF of the tracking control over the recording layer. Also, the switch 1314 functions as a switch for switching the ON/OFF of the tracking control over the recording layer. The servo-layer tracking control is switched ON by the R_TON signal's being switched from Low level to High level. This operation is referred to as recording-layer track pull-in operation. Here, High level and Low level of the R_TON signal and the S_TON signal are not necessarily required to be in the states described earlier. For example, it is also allowable to control the switch so that the switch selects the terminal g when the R_TON signal is at Low level.

In accordance with the tracking driving signal (hereinafter, R_TRD), the actuator driving circuit 108 drives the actuator 1212 in a direction that is parallel to the disc surface. This driving allows the objective lens 1211 to be driven in the disc's radial direction. In this way, the actuator driving circuit 108 in the present embodiment is so constituted as to include both the in-focus-direction driving circuit and the in-tracking-direction driving circuit.

In accordance with the servo-layer tracking driving signal (hereinafter, S_TRD), in order to drive the position of the 650-nm-wavelength optical spot in the direction parallel to the disc surface, the relay-lens driving circuit 109 drives the relay lens 1221 in the direction vertical to the disc surface of the optical disc 101. The present invention, however, is not limited to this configuration. Namely, the following configuration of the optical pickup 102 is also allowable: Namely, in order to control the position of the 650-nm-wavelength optical spot in the direction parallel to the disc surface of the optical disc 101, the relay lens 1221 is driven in the direction parallel to the disc surface. In this way, the relay-lens driving circuit 109 in the present embodiment is so constituted as to include both the in-focus-direction driving circuit and the in-tracking-direction driving circuit.

The servo-error-signal generation circuit 105, the servo-layer tracking control circuit 1310, and the relay-lens driving circuit 109 operate as described earlier. At the time of recording information, this operation allows the tracking control to be performed in such a manner that the 650-nm-wavelength laser spot follows the servo groove formed in the servo layer. Also, the servo-error-signal generation circuit 105, the recording-layer tracking control circuit 1312, and the actuator driving circuit 108 operate as described earlier. At the time of recording information, this operation allows the R_TE to be generated by the servo-error-signal generation circuit 105 from the recording marks formed on the recording layer. Subsequently, this operation allows the tracking control to be performed in such a manner that the 405-nm-wavelength laser spot follows these recording marks.

Furthermore, at the time of reproducing information, the tracking control is performed in such a manner that the 405-nm-wavelength laser spot follows the recording marks formed on the recording layer.

Also, the reproduced-signal processing circuit 106 applies an equalizing processing to the electrical signals detected by the detectors 1214 and 1223, then outputting as a reproduced signal. The reproduced signal is then inputted into the system control circuit 1301. Inside the system control circuit 1301, such processings as amplification, equalization, and decoding are performed, thereby creating information read from the optical disc 101 (such as recording timing, recorded data, and present address information).

At the time of recording information, the reproduced-signal processing circuit 106 creates the recording timing from the wobble of the servo groove formed in the servo layer of the optical disc 101. As this wobble, the wobble specified in the DVD, CD, and BD standards may be physically formed in the servo layer, for example. This wobble frequency, however, is not limited to the specification of the DVD, CD, and BD standards.

Based on an instruction signal outputted from the system control circuit 1301, the aberration-correcting-element driving circuit 110 generates a driving voltage for driving the aberration-correcting element 1209, thereby driving the aberration-correcting element 1209.

(Recording-Time Tracking Control for Implementing Features and Effects of the Present Embodiment)

FIG. 3 illustrates the relationships among the optical spots that are focused onto the recording layer and the servo layer at the recording time in the present embodiment.

At the time of the recording operation, the S_TON signal, the R_TON signal, the S_FON signal, and the R_FON signal illustrated in FIG. 1 are switched at High level. Moreover, the terminal of the switch 1303, the terminal of the switch 1307, the terminal of the switch 1311, and the terminal of the switch 1314 are switched to a, c, e, and g, respectively. Also, it is assumed that the focus control and the tracking control are performed over the recording layer and the servo layer.

The 405-nm-wavelength laser light emitted from the laser diode 1202 is caused to become the three beams by the grating 111 illustrated in FIG. 1. Moreover, the three optical spots resulting therefrom are focused onto a recording layer (i.e. any one layer of the plurality of recording layers) of the optical disc 101 by the objective lens 1211. In FIG. 3, the tracking control is performed at the recording marks by the optical spot 301. The recording and the focus control are performed by the optical spot 300. The confirmation of the unrecorded is performed by the optical spot 302. For example, as a method for confirming the unrecorded using the optical spot 302, it is conceivable to take a difference value between the total amount of reflection light of the optical spot 302 and that of the optical spot 301. Here, it is assumed that the optical disc 101 is the following type of optical disc; namely, the amount of reflection light is higher on an unrecorded area where no recording mark is formed, whereas the amount of reflection light is lower on a recorded area where a recording mark is formed. At this time, the total amount of reflection light of the optical spot 302 travelling on the unrecorded area is subtracted from the total amount of reflection light of the optical spot 301 following the recording marks. Obviously, the calculation result of this subtraction turns out to be negative. In this way, the sign obtained after the difference value is taken makes it possible to confirm whether or not the tracking follow operation at the recording marks is being successful. Also, in the case of the optical disc 101 of the type where, conversely, the amount of reflection light becomes higher if a recording mark is formed, the sigh becomes inverted to the sigh of the above-described former case.

Also, the 650-nm-wavelength laser light emitted from the laser diode 1215 in FIG. 1 is focused onto the servo layer of the optical disc 101 by the relay lens 1221 and the objective lens 1211. Moreover, the optical spot 311 resulting therefrom is used for reproducing, from the servo layer in FIG. 3, the information needed for performing the CLV control. Here, the CLV control means a control of controlling the spindle control circuit 1313 not by using the recording timing and the output signal from the spindle motor 104, but by using the information read from the optical disc 101. Also, the use of the reproduced-signal processing circuit 106 allows the reproduced signal and the address to be read from the optical spot 301 that is following the recording marks, and the optical spot 311. Accordingly, it is also allowable to use this address in order to confirm whether or not the recording at the recording time is being performed at a proper position and on a proper recording layer.

The rotation of the optical disc 101 causes the optical spot 300, the optical spot 301, the optical spot 302, and the optical spot 311 to move in the recording direction, which is illustrated in FIG. 3, with respect to the optical disc 101. Subsequently, while performing the tracking control by the optical spot 301, a recording mark is formed by the optical spot 300.

The track pitch, i.e. the distance in the radial direction between two of the optical spot 300, the optical spot 301, and the optical spot 302, is so adjusted as to become equal to 0.32 um. This adjustment is made by an optical element such as the grating 111. The distance in the circumferential direction, however, is permissible as long as it is a distance that can be resolved by the detector 1214. Here, the design of the radial-direction track pitch of the optical spot 300, the optical spot 301, and the optical spot 302 changes, depending on factors such as the grating 111 and the recording density. Accordingly, 0.32 um is specified merely as one example. Also, in the present embodiment, the laser light has been caused to become the three beams by the grating 111. The following plurality of light beams, however, are also conceivable, as long as the scheme is a scheme where the recording marks on the recording layer are followed: two beams of the optical spot 300 and the optical spot 301, or a plurality of beams (such as, for example, five beams of O-order light's main beam, its ±1st-order lights' servo beams, and its ±2nd-order lights' servo beams). This situation will be basically the same in the following embodiments as well.

The intensity ratio among the three optical spots, i.e. the optical spot 300, the optical spot 301, and the optical spot 302, at the recording time is set at 1:10:1, for example. This setting is employed in order to implement the following situation. Namely, a recording mark is formed by the optical spot 300, and the already-recorded recording marks are not overwritten by the optical spot 301, and the unrecorded area is not recorded by the optical spot 302. The intensity ratio among these optical spots, however, is not limited thereto. Namely, whatever intensity ratio is allowable, as long as the situation is implementable, i.e. a recording mark is formed by the optical spot 300, and the already-recorded recording marks are not overwritten by the optical spot 301, and the unrecorded area is not recorded by the optical spot 302. This situation will be basically the same in the following embodiments as well.

In the present embodiment, when the recording is performed based on the CAV control, the speed of rotation of the optical disc 101 is constant independently of the radius. Accordingly, the control over the spindle motor 104 becomes easier as compared with the case of the CLU control, but the linear velocity changes depending on the radius. As a result, constraints are added to the mechanical structure of the optical disc 101 and the recording film of the recording layer. Meanwhile, the execution of the CLV control requires the execution of a control of making the linear velocity constant independently of the radius. The execution of the CLV control, however, allows the acquisition of an effect of being capable of reducing the constraints added to the mechanical structure of the optical disc 101 and the recording film of the recording layer. In view of this situation, in the present embodiment, the configuration is employed which is controllable by both the CAV control and the CLV control. This situation will be basically the same in the following embodiments as well.

Also, in the present embodiment, the example is employed where the focus control and the tracking control over the servo layer are performed using the single light beam. It is also allowable, however, that the three light beams (i.e. O-order light's main beam, and its ±1st-order lights' servo beams) are used by deploying the grating between the beam splitter 1217 and the polarization beam splitter 1220. The signals generated by the servo-error-signal generation circuit 105 in the present embodiment are implemented as follows. Namely, the schemes such as differential push-pull method (DPP method) and push-pull method are used in the case of the tracking signals whereas the schemes such as knife-edge method and differential astigmatic aberration method are used in the case of the focus signals. The schemes described earlier, however, are not limited, and thus different schemes are also usable. This situation will be basically the same in the following embodiments as well.

In Embodiment 1 of the present invention, the above-described configuration allows the focus control and the tracking control to be performed over the recording layer and the servo layer independently of each other. As a result, the train of the formerly-recorded marks is recoded with a constant spacing placed between these recording marks in the disc's radial direction. This configuration makes it possible to suppress the overwriting of a recording mark over the train of the formerly-recorded marks. Moreover, the operations such as the CLV control and recording-timing generation at the recording time can be performed based on the information acquired from the servo groove.

Incidentally, the optical disc device performs communications with a (not-illustrated) host such as PC (Personal Computer) via an interface such as SATA (Serial Advanced Technology Attachment). This situation will be basically the same in the following embodiments as well.

Embodiment 2

Hereinafter, the explanation will be given below concerning Embodiment 2 of the present invention.
(Disc Structure)
FIG. 2 illustrates the disc structure of the optical disc 101. Since the structure illustrated in FIG. 2 is the same as the one illustrated in Embodiment 1, the explanation thereof will be omitted here.

Features of the Present Embodiment

In Embodiment 2, if, on the recording layer, there exists none of the recording marks to be used for the tracking control by the optical spot 301, or none of a groove equivalent to the recording marks, the information that is needed for the servo-error-signal generation circuit 105 to generate the R_TE signal is not made available from the optical spot 301 on the recording layer. In view of this situation, the tracking control is performed at the servo groove of the servo layer by the optical spot 311. Subsequently, the formation of a recording mark is performed onto the recording layer by the optical spot 300 along the servo groove of the servo layer. On account of this formation of the recording mark, the information that allows the R_TE signal to be generated by the servo-error-signal generation circuit 105 becomes available from the optical spot 301 on the recording layer. Once the R_TE signal becomes available, the recording operation is implemented as follows. Namely, the tracking control is performed at the recording marks on the recording layer by the optical spot 301. Subsequently, the recording is performed by the optical spot 300.

The effects acquired by the present embodiment are the following points. Namely, the present embodiment makes it possible to record information into the optical disc 101 regardless of the presence or absence of the recording marks to be used for the tracking control over the recording layer. Moreover, the present embodiment makes it possible to acquire basically the same effects as those in Embodiment 1.

First of all, in the optical disc device, the various types of processings are performed, such as disc recognition, focus pull-in, tracking pull-in, aberration adjustment, and management information's reproduction. Having received a recording or reproduction instruction from the host, these processings are performed in order to implement the state where the information recording or reproduction is executable. Hereinafter, these processings will be referred to as set-up processings. In these set-up processings, the management information is read which is recorded on the recording layers or the servo layer of the optical disc 101 in FIG. 2. Here, the following conditions are assumed. Namely, the recording layer L0 is in an entirely-recorded state. Moreover, the recording layer L1 is in the unrecorded state, where there exists none of the recording marks to be used for the tracking control by the optical spot 301 in FIG. 3, or none of the groove equivalent to the recording marks.

Also, in the present embodiment, the following conditions are assumed. Namely, the set-up processings are finished on the L0, and the focus jump from the L0 to the L1 is completed in order to record information onto the L1. Furthermore, on the recording layers, only the focus control is switched ON, and the tracking control is swished OFF. On the servo layer, both the focus control and the tracking control are swished ON.

Implementation Method for the Present Embodiment

FIG. 1 illustrates an example of the optical disc device for carrying out the above-described tracking control in accordance with the present embodiment. Since the structure illustrated in FIG. 1 had been explained in Embodiment 1, the explanation thereof will be omitted here.
(Recording-Time Tracking Control for Implementing Features and Effects of the Present Embodiment)

Figure 4:
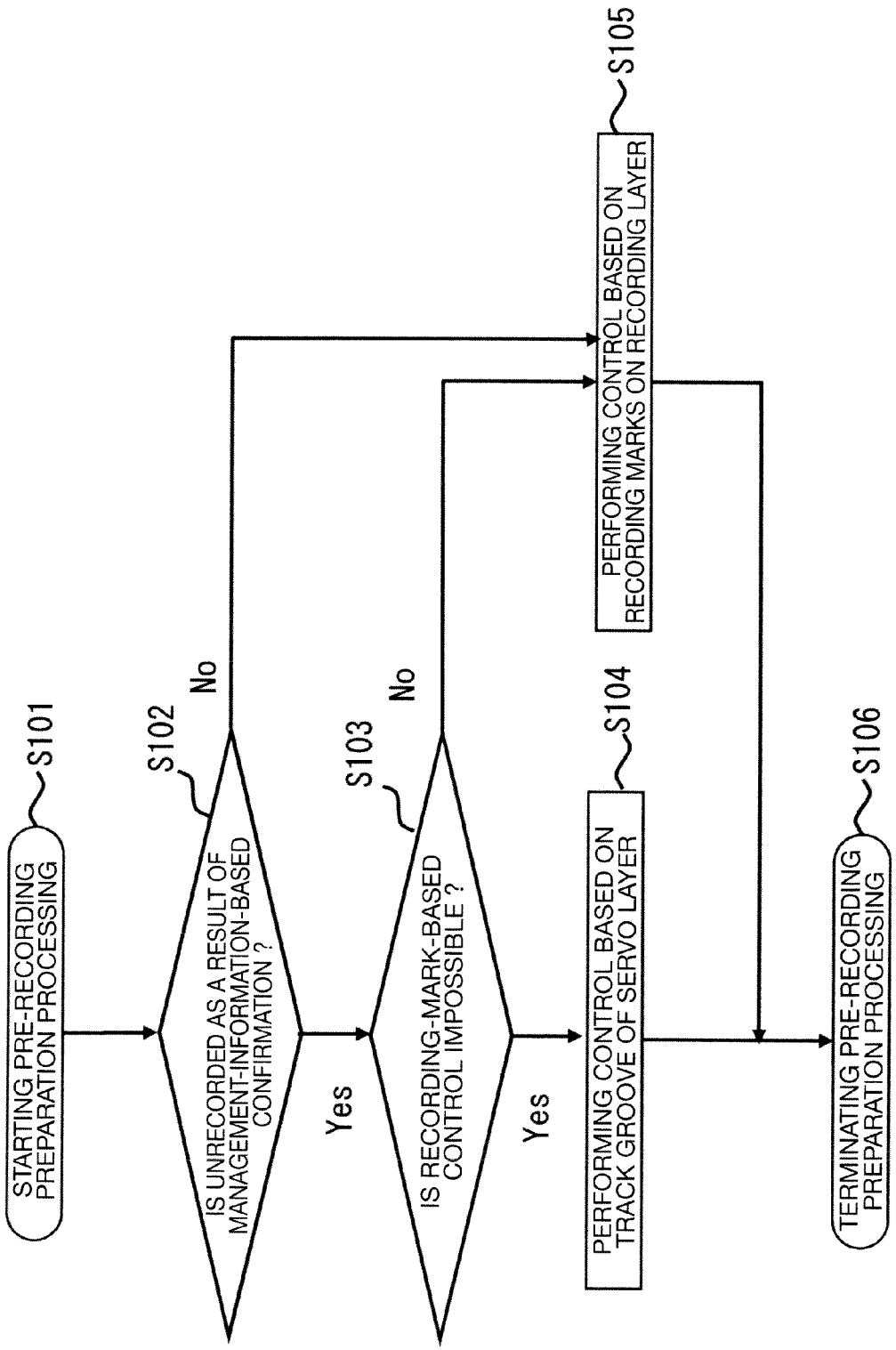
FIG. 4 is a flowchart for the recording-control switching in Embodiment 2.

FIG. 4 illustrates a flowchart for the preparation processing of the tracking control, which is to be performed before the recording in accordance with the present embodiment.

For example, when the system control circuit 1301 in FIG. 1 receives the recording instruction of recording information onto the L1 from the host to the optical disc device, the pre-recording preparation processing is started (Step S101). This processing is a processing for performing a switching as to whether to perform the tracking control at the recording marks on the recording layer by the optical spot 301 in FIG. 3, or to record information onto the recording layer in accordance with the tracking control at the servo groove of the servo layer by the optical spot 311.

First, the explanation will be given below regarding the case of performing a processing (Step S104), where the tracking control is performed based on the track groove of the servo layer.

When the pre-recording preparation processing is started (Step S101), first, based on the above-described management information included in the optical disc 101, it is judged whether or not the recording layer, onto which information is to be recorded, is in the unrecorded state (Step S102). As a result of reproducing the management information, if, on the L1, there exists none of the recording marks to be used for the tracking control by the optical spot 301 in FIG. 3 (Yes at Step S102), it is judged whether or not the recording-marks-based control is executable (Step S103). For example, this judgment is a processing that assumes a case where the management information is recorded in a collective manner when the optical disc 101 is taken out of the optical disc device. In this case, the management information is not updated until the optical disc 101 is taken out of the device. Accordingly, if the recording operation is continued to be performed without taking out the optical disc 101, the execution of the management-information-based confirmation at Step S102 always results in the judgment that the recording layer is in the unrecorded state (Yes at Step S102). In order not to create the condition under which the recording-marks-based tracking control is always prevented from being executed, it is judged whether or not the recording-marks-based control is executable (Step S103). Here, if the R_TE signal can be generated by the servo-error-signal generation circuit 105 in FIG. 1 using the information from the optical spot 5302 (No at Step S103), the R_TON is switched at High level, and the terminal of the switch 1314 is switched from h to g. This switching operation allows the starting of the tracking control where the optical spot 301 follows the recording marks (Step S105). For example, the confirmation can be made as follows as to whether or not it is possible to generate the R_TE signal. Namely, it is impossible to generate the R_TE signal from the optical spot 301 at the recording-starting time like the present embodiment. If, however, the recording is being performed by the optical spot 300, signals from the recorded marks are made available to the optical spot 301 as well. This situation makes it possible to judge that the tracking control where the optical spot 301 follows the recording marks becomes executable.

Also, another confirmation can be made in such a manner that the tracking control that is following the servo layer is switched OFF. As described earlier, if the tracking control is switched OFF, the track-crossing signal from the servo groove is made available from the S_TE signal in the case of the servo layer. Also, the track-crossing signal available from the recording marks on the recording layer is made available as the R_TE signal. If, at this time, the R_TE signal is proximate to the reference electric potential Vref, the recording layer is in the unrecorded state. Consequently, it can also be judged from the track-crossing signal that it is impossible to generate the R_TE signal.

If it is judged that the recording-marks-based control is not executable (Yes at Step S103), the control is performed based on the track groove of the servo layer (Step S104). Concretely, the laser diode 1215 emits the 650-nm-wavelength laser light. This emitted laser light is focused onto the servo layer of the optical disc 101 by the relay lens 1221 and the objective lens 1211. Moreover, based on the servo signal generated by the servo-error-signal generation circuit 105 from this focused optical spot, the relay lens 1221 is caused to follow the servo groove of the servo layer by the relay-lens driving circuit 109.

At this time, the signal that is driven in the disc's radial direction by the objective lens 1211 is not inputted into the actuator driving circuit 108. Accordingly, the signal operates freely. Consequently, it is conceivable that the signal exerts an influence onto the recording quality. In a case like this, for example, a voltage for fixing the relative position between the relay lens 1221 and the objective lens 1211 may also be applied to the actuator driving circuit 108 from the recording-layer tracking control circuit 1312 in correspondence with the S_TE signal. As a result, it turns out that the relative position between the relay lens 1221 and the objective lens 1211 does not change while the recording is underway.

Also, the explanation will be given below regarding the case of performing a processing (Step S105), where the control is performed based on the recording marks on the recording layer.

If the recording layer is in the recorded state (No at Step S102) as a result of the management-information-based confirmation, like Embodiment 1, the tracking control is performed by the optical spot 301's following the recording marks on the recording layer. The recording is started after this pre-recording preparation processing is completed.

Also, as is the case with the above-described No at Step S103, if it becomes possible to generate the S_TE signal by the servo-error-signal generation circuit 105 using the optical spot 301 while the recording is underway, the tracking control may also be switched so that the recording onto the L1 of the optical disc 101 is performed while the optical spot 301 is following the recording marks formed on the L1. Otherwise, the recording may also be started again by stopping the recording once temporarily, and performing the track pull-in of the optical spot 301 onto the recording marks. Furthermore, when the additional recording is performed in the state where the optical disc 101 is not taken out, the recording like Embodiment 1 may also be performed.

In the present embodiment, the following conditions have been assumed. Namely, the set-up processings are finished on the L0, and the focus jump from the L0 to the L1 is completed in order to record information onto the L1. Furthermore, on the recording layers, only the focus control is switched ON, and the tracking control is swished OFF. If, however, there exists none of the recording marks, the signal available from the optical spot 301 is proximate to the potential Vref. Accordingly, the S_TE becomes equal to zero, and the tracking error signal becomes equal to zero. As a result, even if the tracking control over the recording layer is swished ON, no influence is exerted. In view of this situation, the following operation is also executable. Namely, the tracking control over the recording layer is maintained at ON. Then, once a recording mark is formed, the optical spot is caused to follow this recording mark.

The tracking control over the servo layer in the present embodiment is the same as the one in Embodiment 1. Consequently, the explanation thereof will be omitted here.

In the embodiment, the three-beam scheme and the one-beam scheme have been applied to the recording layer and the servo layer, respectively. The following plurality of light beams, however, are also allowable. The three-beam scheme is applied to the recording layer and the servo layer, respectively. Otherwise, two beams, or a plurality of beams (such as, for example, five beams of O-order light's main beam, its ±1st-order lights' servo beams, and its ±2nd-order lights' servo beams) are applied thereto, respectively.

In Embodiment 2 of the present invention, the above-described configuration makes it possible to acquire basically the same effects as those in Embodiment 1. Simultaneously, it becomes possible to record information into the optical disc 101 regardless of the presence or absence of the recording marks to be used for the tracking control over the recording layer.

Embodiment 3

Hereinafter, the explanation will be given below concerning Embodiment 3 of the present invention.
(Disc Structure)
FIG. 2 illustrates the disc structure of the optical disc 101. The structure of the optical disc 101 in the present embodiment has been explained already. Consequently, the explanation thereof will be omitted here.

Features of the Present Embodiment

In the embodiments explained so far, the optical pickup has been so configured as to include the single objective lens. In contrast to this configuration, a feature of the present embodiment is the employment of an optical pickup including the following configuration. Namely, two laser optical paths are so structured as to become independent of each other by deploying two objective lenses in the radial direction.

Figure 6:
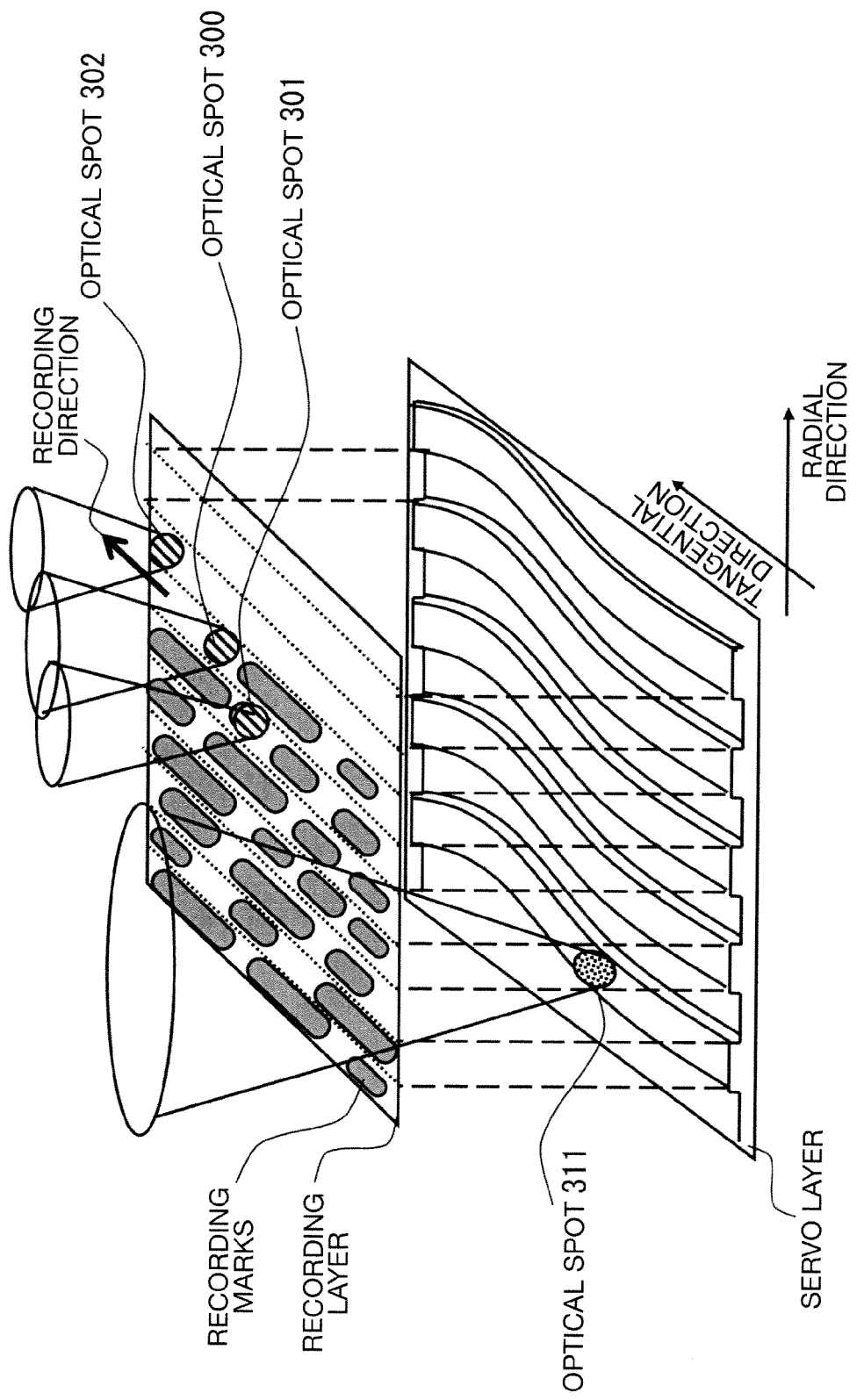
FIG. 6 illustrates the relationships among the optical spots that are focused onto a recording layer and the servo layer at the recording time.

Referring to FIG. 6, the explanation will be given below regarding features of the present embodiment other than the above-described feature. FIG. 6 illustrates a partial portion of the optical disc, which has the structure illustrated in FIG. 2, is cut out and enlarged.

FIG. 6 illustrates the following situation. Namely, the optical spot 300 is focused onto one of the recording layers. This optical spot 300 is recording a recording mark at present, while travelling in the tangential direction of the optical disc 101. Simultaneously, the optical spot 301 and the optical spot 302 are maintained at a constant distance (i.e. spacing) from the optical spot 300. These optical spots 301 and 302 are respectively focused onto a formerly-recorded mark and an area (i.e. unrecorded area) onto which a recording mark is supposed to be recorded later. Moreover, in the present embodiment, the two objective lenses are deployed in the radial direction. This condition gives rise to the occurrence of a shift between the optical spot 300 and the optical spot 311 that is focused onto a groove (i.e. track) of the servo layer. This shift corresponds to the deployment of these two spots in the radial direction. Namely, it turns out that these two spots are focused at the positions that are a few tracks away from each other when converted to the tracks on the servo layer (on the drawing, three tracks away). Incidentally, the optical spots 300, 301, and 302 are split from the same light flux originally, and are emitted through a single (not-illustrated) objective lens. Meanwhile, the optical spot 311 is a light flux that is different from the optical spots 300, 301, and 302, and is emitted through the different objective lens.

Incidentally, the two objective lenses exist. This condition gives rise to the occurrence of a shift in the addresses, when information is reproduced which is acquired from the optical spots on the recording layer and the servo layer. This shift corresponds to a spacing between the objective lenses. The correction for this shift can be successfully made using the following method. The relative address shift is corrected by calculating the mutual address difference from the addresses of the optical spots on the recording layer and the servo layer. Consequently, the following point is also a feature of the present embodiment. The mutual address difference is corrected which is acquired from the addresses of the optical spots on the recording layer and the servo layer. Subsequently, the operations such as CLU control and recording-timing generation at the recording time are performed based on the address information acquired from the servo groove.

The present embodiment makes it possible to acquire basically the same effects as those in Embodiments 1 and 2. Simultaneously, it becomes possible to provide users with the inexpensive optical disc device. This is because specification of the objective lenses can be relaxed. Also, it becomes easier to implement the compatibility with an optical disc (for example, DVD or BD) that performs the recording/reproduction using a single type of laser light-source.

Implementation Method for the Present Embodiment

Figure 5:
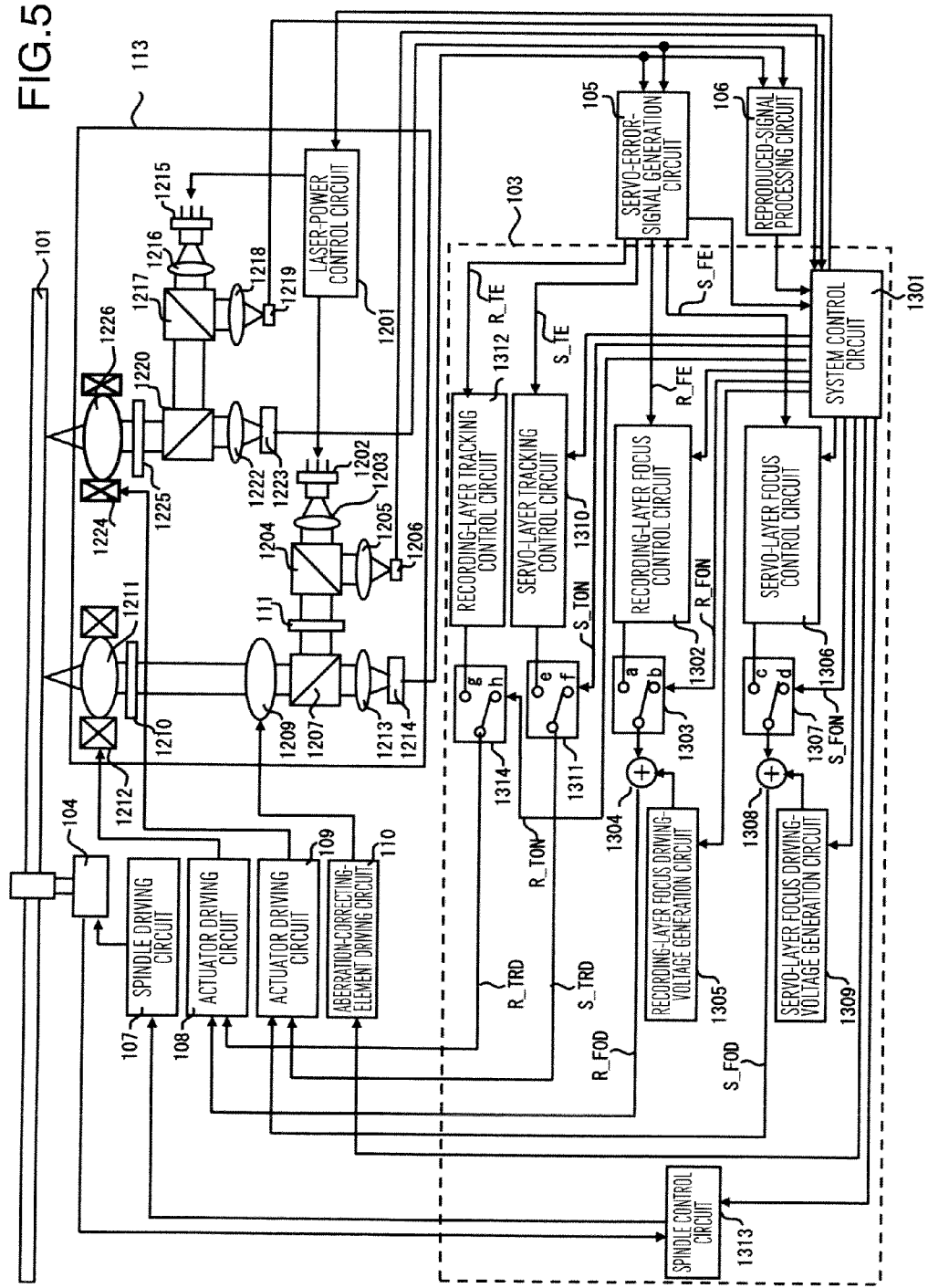
FIG. 5 is a configuration diagram for illustrating the optical disc device of Embodiment 3.

FIG. 5 illustrates an example of the optical disc device for carrying out the above-described recording-time tracking control in accordance with the present embodiment. The configuration in FIG. 5 differs from the one in FIG. 1 in the portion of an optical pickup 113. In the present embodiment, the structure other than the optical pickup 113 is the same as the one in FIG. 1. Consequently, the overlapped explanation thereof will be omitted here.

In the optical disc device, the objective lens 1211 focuses the laser light that has entered the recording layer (i.e. any one layer of the plurality of recording layers), thereby causing the laser spot to be generated. Also, an objective lens 1226 focuses the laser light that has entered the servo layer, thereby causing a laser spot to be generated.

The optical disc device in the present embodiment is constituted from the following configuration components: the optical pickup 113, the signal processing circuit 103, the spindle motor 104, the servo-error-signal generation circuit 105, the reproduced-signal processing circuit 106, the spindle driving circuit 107, the actuator driving circuit 108, an actuator driving circuit 109, and the aberration-correcting-element driving circuit 110.

The explanation of the control over the signal processing circuit 103 and the spindle motor 104 is the same as the one in FIG. 1. Consequently, the explanation thereof will be omitted here.

The optical pickup 113 includes the two optical systems whose wavelengths are different from each other, such as, for example, the 405-nm-wavelength and 650-nm-wavelength.

First, the explanation will be given below regarding the 405-nm-wavelength optical system. The laser-power control circuit 1201, which is controlled by the system control circuit 1301, outputs the driving current for driving the laser diode 1202. Here, a-few-hundreds-of-MHz radio-frequency wave's superposition is applied to this driving current in order to suppress the laser noise. The laser diode 1202 emits the 405-nm-wavelength laser light whose waveform corresponds to that of this driving current. The emitted laser light is caused to become the parallel laser light by the collimator lens 1203. Then, a partial component of this parallel laser light is reflected by the beam splitter 1204, then being focused onto the power monitor 1206 by the focusing lens 1205. The power monitor 1206 feeds back, to the system control circuit 1301, the current or voltage corresponding to the intensity of this laser light. This feedback allows the intensity of the laser light, which is to be focused onto the recording layer of the optical disc 101, to be maintained at the desired value such as, for example, 2 mW. Meanwhile, the laser light which has passed through the beam splitter 1204 is caused to become the plurality of light beams (i.e. 0-order light's main beam and its ±1st-order lights' servo beams) by the three-beam grating 111. Moreover, these light beams are reflected by the polarization beam splitter 1207. The convergences/divergences are controlled by the aberration-correcting element 1209 driven by the aberration-correcting-element driving circuit 110. Furthermore, the laser light beams, whose convergences/divergences have been controlled, are caused to become the circularly-polarized light beams by the quarterwave plate 1210, then being focused onto the recording layer of the optical disc 101 by the objective lens 1211. Here, the position of the objective lens 1211 is controlled by the actuator 1212. Subsequently, the laser light beams, which have been reflected by the optical disc 101, are modulated in their intensities in correspondence with the information recorded into the optical disc 101, then being caused to become the linearly-polarized light beams by the quarterwave plate 1210. The laser light beams then pass through the polarization beam splitter 1207 via the aberration-correcting element 1209. In addition, the laser light beams, which have passed through the polarization beam splitter 1207, are focused onto the detector 1214 by the focusing lens 1213. The detector 1214 detects the intensities of the laser light beams, then outputting signals corresponding thereto to the servo-error-signal generation circuit 105 and the reproduced-signal processing circuit 106.

The servo-error-signal generation circuit 105 generates the following error signals from the signals outputted from the detector 1214 and the detector 1223: the R_FE signal used for the focus control over the recording layer, the S_FE signal used for the focus control over the servo layer, the R_TE signal used for the tracking control over the recording layer, and the S_TE signal used for the tracking control over the servo layer. It is assumed that each error signal is outputted with the electric potential Vref used as its reference.

The focus control and the tracking control in the 405-nm-wavelength optical system are performed on the recording layer (i.e. any one layer of the plurality of recording layers).

Next, the explanation will be given below regarding the 650-nm-wavelength optical system. As is the case with the 405-nm-wavelength optical system, the laser-power control circuit 1201 drives the laser diode 1215. The laser diode 1215 emits the 650-nm-wavelength laser light. The power of a partial component of the laser light is monitored by the power monitor 1219 via the collimator lens 1216, the beam splitter 1217, and the focusing lens 1218. The power monitored is fed back to the system control circuit 1301. This feedback allows the intensity of the laser light, which is to be focused onto the servo layer of the optical disc 101, to be maintained at the desired power such as, for example, 3 mW. Meanwhile, the laser light which has passed through the beam splitter 1217 is reflected by the polarization beam splitter 1220. Moreover, the laser light passes through a quarterwave plate 1225, then being focused onto the servo layer of the optical disc 101 by the objective lens 1226. Furthermore, the laser light, which has been reflected by the optical disc 101, passes through the polarization beam splitter 1220. Finally, the laser light is focused onto the detector 1223 by the focusing lens 1222.

The focus control and the tracking control in the 650-nm-wavelength optical system are performed on the servo layer.

Based on an instruction signal outputted from the system control circuit 1301, the servo-layer focus control circuit 1306 performs compensations for the gain and phase of the S_FE signal. Moreover, the control circuit 1306 outputs a driving signal for performing the focus control over the servo layer. The driving signal is inputted into the actuator driving circuit 109 via the switch 1307 and the adder 1308. This operation allows the execution of the focus control over the servo layer.

The actuator driving circuit 109 drives an actuator 1224 installed inside the optical pickup 113. This driving allows the focus control to be performed over the servo layer. The actuator driving circuit 109 and the servo-layer focus control circuit 1306 operate as described earlier. This operation allows the focus control over the servo layer to be performed in accordance with the following manner. Namely, the 650-nm-wavelength laser spot, with which the optical disc 101 is irradiated, is always focused on the surface of the servo layer of the optical disc 101.

Here, High level and Low level of the R_FON signal and the S_FON signal are not necessarily required to be in the states described earlier. For example, it is also allowable to control the switch so that the switch selects the terminal a when the R_FON signal is at Low level.

Also, in accordance with the S_TRD, the actuator driving circuit 109 drives the actuator 1224 in the direction that is parallel to the disc surface. This driving allows the objective lens 1226 to be driven in the disc's radial direction. In this way, the actuator driving circuit 109 in the present embodiment is so constituted as to include both the in-focus-direction driving circuit and the in-tracking-direction driving circuit.

The servo-error-signal generation circuit 105, the servo-layer tracking control circuit 1310, and the actuator driving circuit 109 operate as described earlier. At the time of recording information, this operation allows the tracking control to be performed in such a manner that the 650-nm-wavelength laser spot follows the servo groove formed in the servo layer. Also, the servo-error-signal generation circuit 105, the recording-layer tracking control circuit 1312, and the actuator driving circuit 108 operate as described earlier. At the time of recording information, this operation allows the R_TE to be generated from the recording marks formed on the recording layer. Subsequently, this operation allows the tracking control to be performed in such a manner that the 405-nm-wavelength laser spot follows these recording marks.

(Recording-Time Tracking Control for Implementing Features and Effects of the Present Embodiment)

FIG. 6 illustrates the relationships among the optical spots that are focused onto the recording layer and the servo layer at the recording time in the present embodiment.

At the time of the recording operation, the S_TON signal, the R_TON signal, the S_FON signal, and the R_FON signal illustrated in FIG. 5 are switched at High level. Moreover, the terminal of the switch 1303, the terminal of the switch 1307, the terminal of the switch 1311, and the terminal of the switch 1314 are selected to a, c, e, and g, respectively. Also, it is assumed that the focus control and the tracking control are performed over the recording layer and the servo layer.

The 405-nm-wavelength laser light emitted from the laser diode 1202 is caused to become the three beams by the grating 111 illustrated in FIG. 5. Moreover, the three optical spots resulting therefrom are focused onto a recording layer (i.e. any one layer of the plurality of recording layers) of the optical disc 101 by the objective lens 1211. In FIG. 6, the tracking control is performed at the recording marks by the optical spot 301. The recording and the focus control are performed by the optical spot 300. The confirmation of the unrecorded is performed by the optical spot 302. For example, as a method for confirming the unrecorded using the optical spot 302, it is conceivable to take a difference value between the total amount of reflection light of the optical spot 302 and that of the optical spot 301. Here, it is assumed that the optical disc 101 is the following type of optical disc; namely, the amount of reflection light is higher on an unrecorded area where no recording mark is formed, whereas the amount of reflection light is lower on a recorded area where a recording mark is formed. At this time, the total amount of reflection light of the optical spot 302 travelling on the unrecorded area is subtracted from the total amount of reflection light of the optical spot 301 following the recording marks. Obviously, the calculation result of this subtraction turns out to be negative. In this way, the sign obtained after the difference value is taken makes it possible to confirm whether or not the tracking follow operation at the recording marks is being successful. Also, in the case of the optical disc 101 of the type where, conversely, the amount of reflection light becomes higher if a recording mark is formed, the sigh becomes inverted to the sigh of the above-described former case.

Also, the 650-nm-wavelength laser light emitted from the laser diode 1215 in FIG. 5 is focused onto the servo layer of the optical disc 101 by the objective lens 1226. Moreover, the optical spot 311 resulting therefrom is used for reproducing, from the servo layer in FIG. 6, the information needed for performing the CLV control. Here, the CLV control means a control of controlling the spindle control circuit 1313 not by using the recording timing and the output signal from the spindle motor 104, but by using the information read from the optical disc 101. Also, the use of the reproduced-signal processing circuit 106 allows the reproduced signal and the address to be read from the optical spot 301 that is following the recording marks, and the optical spot 311. Accordingly, it is also allowable to use this address in order to confirm whether or not the recording at the recording time is being performed at a proper position and on a proper recording layer.

The rotation of the optical disc 101 causes the optical spot 300, the optical spot 301, the optical spot 302, and the optical spot 311 to move in the recording direction, which is illustrated in FIG. 6, with respect to the optical disc 101. Subsequently, while performing the tracking control by the optical spot 301, a recording mark is formed by the optical spot 300.

The track pitch, i.e. the distance in the radial direction between two of the optical spot 300, the optical spot 301, and the optical spot 302, is so adjusted as to become equal to 0.32 um. This adjustment is made by an optical element such as the grating 111. The distance in the circumferential direction, however, is permissible as long as it is a distance that can be resolved by the detector 1214. Here, the design of the radial-direction track pitch of the optical spot 300, the optical spot 301, and the optical spot 302 changes, depending on factors such as the grating 111 and the recording density. Accordingly, 0.32 um is specified merely as one example.

Also, in the present embodiment, the two objective lenses are deployed in the radial direction. It is also allowable, however, that the two objective lenses are deployed in the circumferential direction (which, hereinafter, will be referred to as a "tangential direction").

In Embodiment 3 of the present invention, unlike Embodiment 1 and Embodiment 2, the above-described configuration allows the two objective lenses to be deployed inside the optical pickup. As a result, the positions of the optical spots, which are focused onto the servo layer and the recording layer, are made different from each other by a few tracks. The correction for this difference, however, is made in such a manner that the address obtained from the servo layer and the address obtained from the recording layer are corrected. This correction, like Embodiment 1 and Embodiment 2, allows the focus control and the tracking control to be performed over the recording layer and the servo layer independently of each other. As a result, the train of the formerly-recorded marks is recoded with a constant spacing placed between these recording marks in the disc's radial direction. This configuration makes it possible to suppress the overwriting of a recording mark over the train of the formerly-recorded marks. Moreover, the operations such as the CLU control and recording-timing generation at the recording time can be performed based on the information acquired from the servo groove. Furthermore, in the present embodiment, the specification of the objective lenses can be relaxed. This configuration makes it possible to provide users with the inexpensive optical disc device. Also, it becomes easier to implement the compatibility with an optical disc (for example, DVD or BD) that performs the recording/reproduction using a single type of laser light-source.

Embodiment 4

Hereinafter, the explanation will be given below concerning Embodiment 4 of the present invention.

(Disc Structure)

FIG. 2 illustrates the disc structure of the optical disc 101. The structure of the optical disc 101 in the present embodi-

Features of the Present Embodiment

Figure 7:
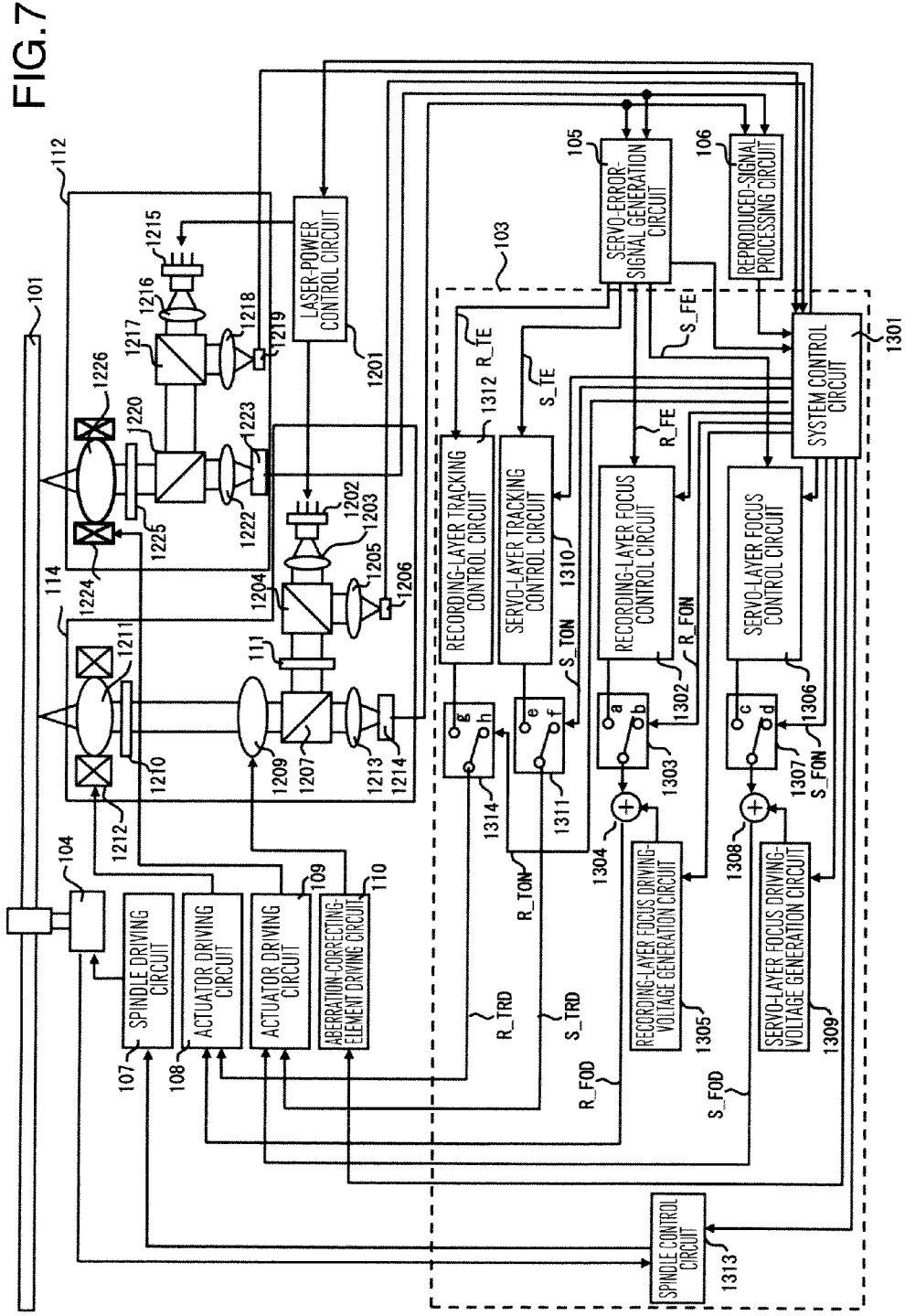
FIG. 7 is a configuration diagram for illustrating the optical disc device of Embodiment 4.

FIG. 7 illustrates the configuration of an optical disc device according to the present embodiment. In the embodiments explained so far, the optical disc device has been so configured as to include the single optical pickup. A feature of the present embodiment, however, is the point of the optical disc device including two optical pickups. Referring to FIG. 6, the explanation will be given below regarding features of the present embodiment other than the above-described feature. FIG. 6 illustrates a partial portion of the optical disc, which has the structure illustrated in FIG. 2, is cut out and enlarged.

FIG. 6 illustrates the following situation. Namely, the optical spot 300 is focused onto one of the recording layers. This optical spot 300 is recording a recording mark at present, while travelling in the tangential direction of the optical disc 101. Simultaneously, the optical spot 301 and the optical spot 302 are maintained at a constant distance (i.e. spacing) from the optical spot 300. These optical spots 301 and 302 are respectively focused onto a formerly-recorded mark and an area (i.e. unrecorded area) onto which a recording mark is supposed to be recorded later. Moreover, in the present embodiment, the two objective lenses are deployed in the radial direction. This condition gives rise to the occurrence of a shift between the optical spot 300 and the optical spot 311 that is focused onto a groove (i.e. track) of the servo layer. This shift corresponds to the deployment of these two spots in the radial direction. Namely, it turns out that these two spots are focused at the positions that are a few tracks away from each other when converted to the tracks on the servo layer (on the drawing, three tracks away). Incidentally, the optical spots 300, 301, and 302 are split from the same light flux originally, and are emitted through a single (not-illustrated) objective lens. Meanwhile, the optical spot 311 is a light flux that is different from the optical spots 300, 301, and 302, and is emitted through the different objective lens.

Incidentally, the two optical pickups exist. This condition gives rise to the occurrence of a shift in the addresses, when information is reproduced which is acquired from the optical spots on the recording layer and the servo layer. This shift corresponds to a spacing between the objective lenses. The correction for this shift can be successfully made using the following method. The relative address shift is corrected by calculating the mutual address difference from the addresses of the optical spots on the recording layer and the servo layer. Consequently, the following point is also a feature of the present embodiment. The mutual address difference is corrected which is acquired from the addresses of the optical spots on the recording layer and the servo layer. Subsequently, the operations such as CLU control and recording-timing generation at the recording time are performed based on the address information acquired from the servo groove.

Implementation Method for the Present Embodiment

In the present embodiment, the structure other than optical pickups 112 and 114 is the same as the one in FIG. 1. Consequently, the overlapped explanation thereof will be omitted here.

In the optical disc device, the objective lens 1211 focuses the laser light that has entered the recording layer (i.e. any one layer of the plurality of recording layers), thereby causing the laser spot to be generated. Also, an objective lens 1226 focuses the laser light that has entered the servo layer, thereby causing a laser spot to be generated.

The optical disc device in the present embodiment is constituted from the following configuration components: the optical pickup 114, the optical pickup 112, the signal processing circuit 103, the spindle motor 104, the servo-error-signal generation circuit 105, the reproduced-signal processing circuit 106, the spindle driving circuit 107, the actuator driving circuit 108, the actuator driving circuit 109, and the aberration-correcting-element driving circuit 110.

The explanation of the control over the signal processing circuit 103 and the spindle motor 104 is the same as the one in FIG. 1. Consequently, the explanation thereof will be omitted here.

The optical pickup 112 includes, for example, the 650-nm-wavelength optical system whereas the optical pickup 114 includes, for example, the 405-nm-wavelength optical system.

First, the explanation will be given below concerning the 405-nm-wavelength optical system of the optical pickup 114. The laser-power control circuit 1201, which is controlled by the system control circuit 1301, outputs the driving current for driving the laser diode 1202. Here, a-few-hundreds-of-MHz radio-frequency wave's superposition is applied to this driving current in order to suppress the laser noise. The laser diode 1202 emits the 405-nm-wavelength laser light whose waveform corresponds to that of this driving current. The emitted laser light is caused to become the parallel laser light by the collimator lens 1203. Then, a partial component of this parallel laser light is reflected by the beam splitter 1204, then being focused onto the power monitor 1206 by the focusing lens 1205. The power monitor 1206 feeds back, to the system control circuit 1301, the current or voltage corresponding to the intensity of this laser light. This feedback allows the intensity of the laser light, which is to be focused onto the recording layer of the optical disc 101, to be maintained at the desired value such as, for example, 2 mW. Meanwhile, the laser light which has passed through the beam splitter 1204 is caused to become the plurality of light beams (i.e. O-order light's main beam and its ±1st-order lights' servo beams) by the three-beam grating 111. Moreover, these light beams are reflected by the polarization beam splitter 1207. The convergences/divergences are controlled by the aberration-correcting element 1209 driven by the aberration-correcting-element driving circuit 110. Furthermore, the laser light beams, whose convergences/divergences have been controlled, are caused to become the circularly-polarized light beams by the quarterwave plate 1210, then being focused onto the recording layer of the optical disc 101 by the objective lens 1211. Here, the position of the objective lens 1211 is controlled by the actuator 1212. Subsequently, the laser light beams, which have been reflected by the optical disc 101, are modulated in their intensities in correspondence with the information recorded into the optical disc 101, then being caused to become the linearly-polarized light beams by the quarterwave plate 1210. The laser light beams then pass through the polarization beam splitter 1207 via the aberration-correcting element 1209. In addition, the laser light beams, which have passed through the polarization beam splitter 1207, are focused onto the detector 1214 by the focusing lens 1213. The detector 1214 detects the intensities of the laser light beams, then outputting the signals corresponding thereto to the servo-error-signal generation circuit 105 and the reproduced-signal processing circuit 106.

Next, the explanation will be given below concerning the 650-nm-wavelength optical system of the optical pickup 112. As is the case with the 405-nm-wavelength optical system, the laser-power control circuit 1201 drives the laser diode 1215. The laser diode 1215 driven emits the 650-nm-wavelength laser light. The power of a partial component of the laser light is monitored by the power monitor 1219 via the collimator lens 1216, the beam splitter 1217, and the focusing lens 1218. The power monitored is fed back to the system control circuit 1301. This feedback allows the intensity of the laser light, which is to be focused onto the servo layer of the optical disc 101, to be maintained at the desired power such as, for example, 3 mW. Meanwhile, the laser light which has passed through the beam splitter 1217 is reflected by the polarization beam splitter 1220. Moreover, the laser light passes through the quarterwave plate 1225, then being focused onto the servo layer of the optical disc 101 by the objective lens 1226. Furthermore, the laser light, which has been reflected by the optical disc 101, passes through the polarization beam splitter 1220. Finally, the laser light is focused onto the detector 1223 by the focusing lens 1222.

The actuator driving circuit 109 drives the actuator 1224 installed inside the optical pickup 112. This driving allows the focus control to be performed over the servo layer.

Also, in accordance with the S_TRD, the actuator driving circuit 109 drives the actuator 1224 in the direction that is parallel to the disc surface. This driving allows the objective lens 1226 to be driven in the disc's radial direction. In this way, the actuator driving circuit 109 in the present embodiment is so constituted as to include both the in-focus-direction driving circuit and the in-tracking-direction driving circuit.

The servo-error-signal generation circuit 105, the servo-layer tracking control circuit 1310, and the actuator driving circuit 109 operate as described earlier. At the time of recording information, this operation allows the tracking control to be performed in such a manner that the 650-nm-wavelength laser spot follows the servo groove formed in the servo layer. Also, the servo-error-signal generation circuit 105, the recording-layer tracking control circuit 1312, and the actuator driving circuit 108 operate as described earlier. At the time of recording information, this operation allows the R_TE to be generated from the recording marks formed on the recording layer. Subsequently, this operation allows the tracking control to be performed in such a manner that the 405-nm-wavelength laser spot follows these recording marks.

(Recording-Time Tracking Control for Implementing Features and Effects of the Present Embodiment)

FIG. 6 illustrates the relationships among the optical spots that are focused onto the recording layer and the servo layer at the recording time in the present embodiment.

At the time of the recording operation, the S_TON signal, the R_TON signal, the S_FON signal, and the R_FON signal illustrated in FIG. 7 are switched at High level. Moreover, the terminal of the switch 1303, the terminal of the switch 1307, the terminal of the switch 1311, and the terminal of the switch 1314 are selected to a, c, e, and g, respectively. Also, it is assumed that the focus control and the tracking control are performed over the recording layer and the servo layer.

The 405-nm-wavelength laser light emitted from the laser diode 1202 is caused to become the three beams by the grating 111 illustrated in FIG. 7. Moreover, the three optical spots resulting therefrom are focused onto a recording layer (i.e. any one layer of the plurality of recording layers) of the optical disc 101 by the objective lens 1211. In FIG. 6, the tracking control is performed at the recording marks by the optical spot 301. The recording and the focus control are performed by the optical spot 300. The confirmation of the unrecorded is performed by the optical spot 302. For example, as a method for confirming the unrecorded using the optical spot 302, it is conceivable to take a difference value between the total amount of reflection light of the optical spot 302 and that of the optical spot 301. Here, it is assumed that the optical disc 101 is the following type of optical disc; namely the amount of reflection light is higher on an unrecorded area where no recording mark is formed, whereas the amount of reflection light is lower on a recorded area where a recording mark is formed. At this time, the total amount of reflection light of the optical spot 302 travelling on the unrecorded area is subtracted from the total amount of reflection light of the optical spot 301 following the recording marks. Obviously, the calculation result of this subtraction turns out to be negative. In this way, the sign obtained after the difference value is taken makes it possible to confirm whether or not the tracking follow operation at the recording marks is being successful. Also, in the case of the optical disc 101 of the type where, conversely, the amount of reflection light becomes higher if a recording mark is formed, the sigh becomes inverted to the sigh of the above-described former case.

Also, the 650-nm-wavelength laser light emitted from the laser diode 1215 in FIG. 7 is focused onto the servo layer of the optical disc 101 by the objective lens 1226. Moreover, the optical spot 311 resulting therefrom is used for reproducing, from the servo layer in FIG. 6, the information needed for performing the CLV control. Here, the CLV control means a control of controlling the spindle control circuit 1313 not by using the recording timing and the output signal from the spindle motor 104, but by using the information read from the optical disc 101. Also, the use of the reproduced-signal processing circuit 106 allows the reproduced signal and the address to be read from the optical spot 301 that is following the recording marks, and the optical spot 311. Accordingly, it is also allowable to use this address in order to confirm whether or not the recording at the recording time is being performed at a proper position and on a proper recording layer.

The rotation of the optical disc 101 causes the optical spot 300, the optical spot 301, the optical spot 302, and the optical spot 311 to move into the recording direction, which is illustrated in FIG. 6, with respect to the optical disc 101. Subsequently, while performing the tracking control by the optical spot 301, a recording mark is formed by the optical spot 300.

The track pitch, i.e. the distance in the radial direction between two of the optical spot 300, the optical spot 301, and the optical spot 302, is so adjusted as to become equal to 0.32 um. This adjustment is made by an optical element such as the grating 111. The distance in the circumferential direction, however, is permissible as long as it is a distance that can be resolved by the detector 1214. Here, the design of the radial-direction track pitch of the optical spot 300, the optical spot 301, and the optical spot 302 changes, depending on factors such as the grating 111 and the recording density. Accordingly, 0.32 um is specified merely as one example.

In Embodiment 4 of the present invention, unlike Embodiment 3, the above-described configuration allows the two optical pickups to be deployed. This configuration makes it possible to solve the problem that the positions of the optical spots, which are focused onto the servo layer and the recording layer, are made different from each other by a few tracks. Also, like Embodiment 1 and Embodiment 2, the focus control and the tracking control are performed over the recording layer and the servo layer independently of each other. As a result, the train of the formerly-recorded marks is recoded with a constant spacing placed between these recording marks in the disc's radial direction. This configuration makes it possible to suppress the overwriting of a recording mark over the train of the formerly-recorded marks. Moreover, the operations such as the CLU control and recording-timing generation at the recording time can be performed based on the information acquired from the servo groove. Furthermore, in the present embodiment, the specification of the objective lenses can be relaxed. This configuration makes it possible to provide users with the inexpensive optical disc device. Also, it becomes easier to implement the compatibility with an optical disc (for example, DVD or BD) that performs the recording/reproduction using a single type of laser light-source.

Embodiment 5

Hereinafter, the explanation will be given below concerning Embodiment 5 of the present invention.
(Disc Structure)
FIG. 2 illustrates the disc structure of the optical disc 101. The structure of the optical disc 101 in the present embodiment has been explained already. Consequently, the explanation thereof will be omitted here.

Features of the Present Embodiment

Figure 8:
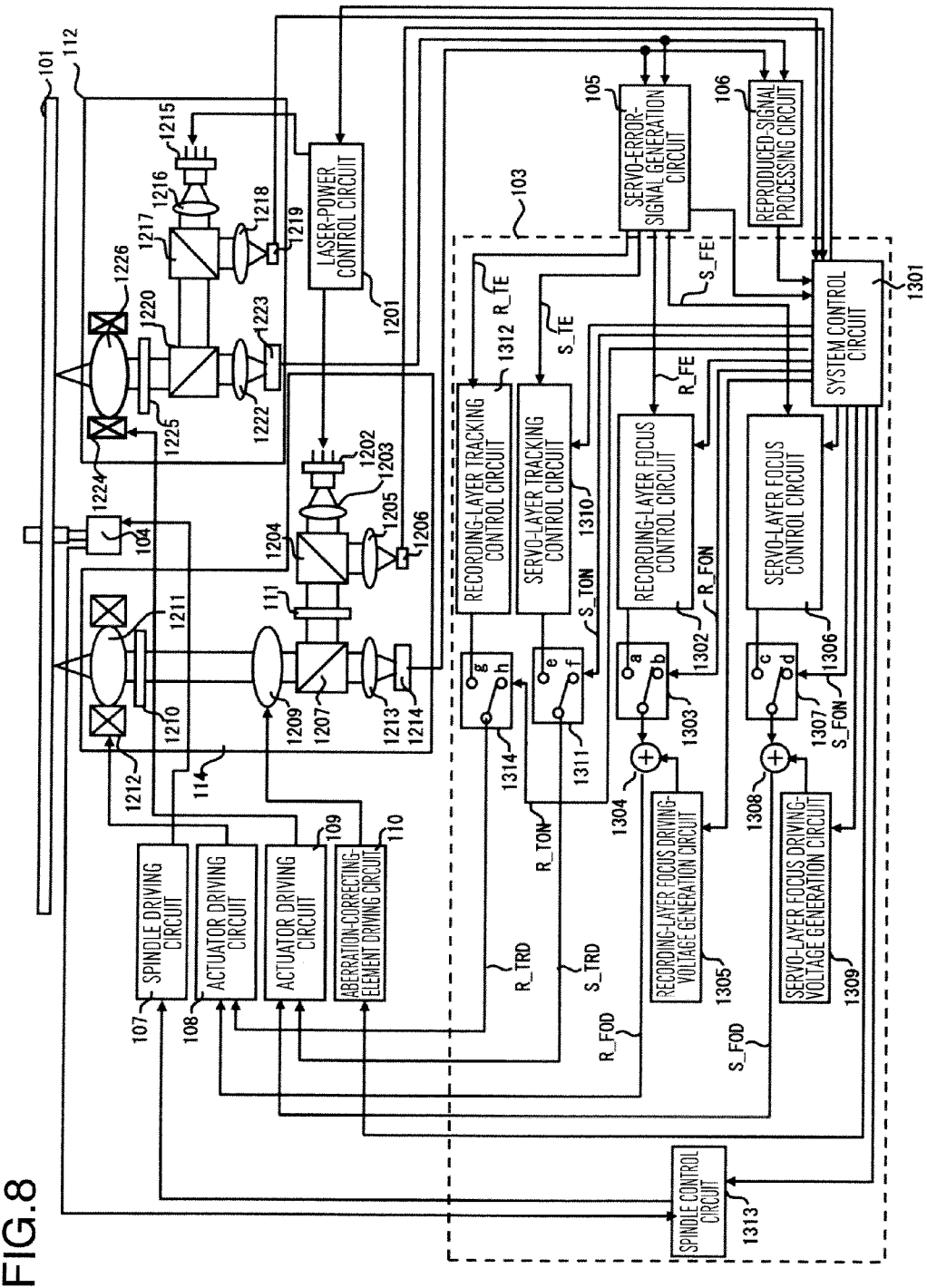
FIG. 8 is a configuration diagram for illustrating the optical disc device of Embodiment 5.

FIG. 8 illustrates the configuration of an optical disc device according to the present embodiment. A feature of the present embodiment is the following point. Namely, the optical disc device includes two optical pickups. Moreover, these two optical pickups are deployed at positions that are symmetrical to each other with respect to the rotation axis of the spindle motor. Referring to FIG. 9, the explanation will be given below regarding features of the present embodiment other than the above-described feature. FIG. 9 illustrates a partial portion of the optical disc, which has the structure illustrated in FIG. 2, is cut out and enlarged.

FIG. 9 illustrates the following situation. Namely, the optical spot 300 is focused onto one of the recording layers. This optical spot 300 is recording a recording mark at present, while travelling in the tangential direction of the optical disc 101. Simultaneously, the optical spot 301 and the optical spot 302 are maintained at a constant distance (i.e. spacing) from the optical spot 300. These optical spots 301 and 302 are respectively focused onto a formerly-recorded mark and an area (i.e. unrecorded area) onto which a recording mark is supposed to be recorded later. Moreover, the two objective lenses are deployed at the positions that are symmetrical to each other with respect to the rotation axis of the spindle motor 104. This condition makes it possible to reduce a track shift between the optical spot 300 and the optical spot 311 that is focused onto a groove (i.e. track) of the servo layer. This track shift corresponds to the radial positions of the optical pickup 112 and the optical pickup 114. Namely, this reduction in the track shift allows the two optical spots to be focused at the same radial position when converted to the tracks on the servo layer. Incidentally, the optical spots 300, 301, and 302 are split from the same light flux originally, and are emitted through a single (not-illustrated) objective lens. Meanwhile, the optical spot 311 is a light flux that is different from the optical spots 300, 301, and 302, and is emitted through the different objective lens.

Implementation Method for the Present Embodiment

In the present embodiment, the configuration other than the positions of the optical pickups 112 and 114 is the same as the one in FIG. 7. Consequently, the overlapped explanation thereof will be omitted here.

Next, the explanation will be given below regarding the control due to the optical pickup 112 and the optical pickup 114 to be deployed at the positions that are symmetrical to each other with respect to the rotation axis of the spindle motor 104. In the present embodiment, the two optical pickups exist. This condition allows the addresses of the optical spots to be read when the information is reproduced which is acquired from the optical spots on the recording layer and the servo layer. The shift, however, exists between the addresses read. The correction for this shift can be successfully made as follows, for example. Namely, the relative address-shift amount is determined by calculating the mutual address difference from the addresses of the optical spots on the recording layer and the servo layer. Subsequently, the two optical pickups are controlled so that this relative address-shift amount becomes constant. Consequently, the following point is also a feature of the present embodiment: The mutual address difference is corrected which is acquired from the addresses of the optical spots on the recording layer and the servo layer. Subsequently, the operations such as CLU control and recording-timing generation at the recording time are performed based on the address information acquired from the servo groove.

In the present embodiment, the laser-power control circuit 1201 is so configured as to be deployed outside the optical pickup 112 and the optical pickup 114. It is also allowable, however, that the circuit 1201 is integrated into these optical pickups as a laser-power control circuit for the optical pickup 112 and a laser-power control circuit for the optical pickup 114.

In the present embodiment, the optical pickup 112 and the optical pickup 114 are deployed at the two positions, which are symmetrical to each other with respect to the rotation axis of the spindle motor 104.

In Embodiment 5 of the present invention, the above-described configuration makes it possible to acquire basically the same effects as those in Embodiment 4. Simultaneously, the amount of address shift like the one in Embodiment 4 due to the positions of the optical pickups on the recording layer and the servo layer can be rendered as the amount of circumferential-direction address shift at the same radius. This condition makes it possible to reduce the address-shift amount.

Incidentally, the above-described respective embodiments have been explained assuming the employment of a write-once disc. It is needless to say, however, that the present invention is not limited thereto, but can also be applied to a rewritable disc. In this case, the present invention makes it possible to suppress a recording position different from the desired recording position from being erroneously overwritten by new data.

Incidentally, the present invention is not limited to the above-described embodiments, but includes a variety of modified embodiments. For example, the above-described embodiments have been explained in detail in order to explain the present invention in an easy-to-understand manner. Namely, the above-described embodiments are not necessarily limited to the ones that include all of the configurations explained. Also, a partial portion of the configuration of a certain embodiment can be replaced by the configuration of another embodiment. Also, the configuration of another embodiment can be added to the configuration of a certain embodiment. Also, the control lines and information lines specified are the ones that can be considered as being necessary from the explanation's point-of-view. Namely, all of the control lines and information lines are not necessarily specified when seen from the product's point-of-view. It may also be considered that, actually, almost all of the configurations are mutually connected to each other.

REFERENCE SIGNS LIST

101 ... optical disc
102 ... optical pickup
103 ... signal processing circuit
104 ... spindle motor
105 ... servo-error-signal generation circuit
106 ... reproduced-signal processing circuit
107 ... spindle driving circuit
108 ... actuator driving circuit
109 ... relay-lens driving circuit
110 ... aberration-correcting-element driving circuit
111 ... grating
112 ... optical pickup
113 ... optical pickup
114 ... optical pickup
1201 ... laser-power control circuit
1202 ... laser diode
1203 ... collimator lens
1204 ... beam splitter
1205 ... focusing lens
1206 ... power monitor
1207 ... polarization beam splitter
1208 ... dichroic mirror
1209 ... aberration-correcting element
1210 ... quarterwave plate
1211 ... objective lens
1212 ... actuator
1213 ... focusing lens
1214 ... detector
1215 ... laser diode
1216 ... collimator lens
1217 ... beam splitter
1218 ... focusing lens
1219 ... power monitor
1220 ... polarization beam splitter
1221 ... relay lens
1222 ... focusing lens
1223 ... detector
1224 ... actuator
1225 ... quarterwave plate
1226 ... objective lens
1301 ... system control circuit
1302 ... recording-layer focus control circuit
1303 ... switch
1304 ... adder
1305 ... recording-layer focus driving-voltage generation circuit
1306 ... servo-layer focus control circuit
1307 ... switch
1308 ... adder
1309 ... servo-layer focus driving-voltage generation circuit
1310 ... tracking control circuit
1311 ... switch
1312 ... recording-layer tracking control circuit
1313 ... spindle control circuit
1314 ... switch

The invention claimed is:

1. An optical disc device for performing recording into an optical disc, which is constituted from at least one servo layer having tracks and one or more recording layers, each of the recording layers having no tracks, comprising:
 a first laser light-source which emits a laser light beam on the servo layer of the optical disc;
 a second laser light-source which emits a laser light beam on the recording layers of the optical disc;
 an objective lens which focuses laser light beams emitted by the first laser light-source and the second laser light-source;
 a relay lens which controls convergence and divergence of a first laser light beam emitted by the first laser light-source;
 a first actuator which drives the relay lens;
 a second actuator which drives the objective lens;
 a first control unit which controls the first actuator; and
 a second control unit which controls the second actuator,
 wherein the first control unit controls the first actuator so that a position of a spot on the optical disc moves in a direction perpendicular to a surface of the optical disc and in a radial direction of the optical disc,
 wherein the second control unit controls the second actuator so that a position of a spot on the optical disc moves in a direction perpendicular to a surface of the optical disc and in a radial direction of the optical disc, and
 wherein, when recording of information onto the recording layers of the optical disc is performed, a recording mark is formed while performing tracking control of the second actuator onto the recording layers using an optical spot irradiated onto the recording layers of the optical disc by the second laser light-source.

2. The optical disc device according to claim 1, wherein, when recording of information onto the recording layers of the optical disc is performed, information about a timing of writing into the recording layers of the optical disc is generated using an optical spot irradiated on the servo layer of the optical disc by the first laser light-source.

3. The optical disc device according to claim 2, wherein, when recording of information onto the recording layers of the optical disc is performed, a first optical spot and a second optical spot are irradiated on the recording layers by the second laser light-source, and a recording mark is formed using the second optical spot while performing tracking control of the second actuator using the first optical spot.

4. The optical disc device according to claim 3, wherein, when recording of information onto the recording layers of the optical disc is performed, a plurality of optical spots are irradiated on the recording layers by the second laser light-source, and a recording mark is formed using an optical spot while performing tracking control of the second actuator using another optical spot irradiated on a recording mark.

5. The optical disc device according to claim 3, wherein, when recording of information onto recording layers of the optical disc is performed, a plurality of optical spots are irradiated on the recording layers by the second laser light-source, and a recording mark is formed using an optical spot while performing tracking control of the second actuator using another optical spot irradiated on an adjacent recording mark.

6. The optical disc device according to claim 1, wherein, when recording of information onto the recording layers of the optical disc is performed, tracking control of the first actuator is performed with an optical spot irradiated on the servo layer of the optical disc by the first laser light-source.

7. The optical disc device according to claim 2, wherein, when recording of information onto the recording layers of the optical disc is performed, tracking control of the first actuator is performed with an optical spot irradiated on the servo layer of the optical disc by the first laser light-source.

8. An optical disc device for performing recording into an optical disc, which is constituted from at least one servo layer having tracks and one or more recording layers, each of the recording layers having no tracks, comprising:
- a first laser light-source which emits a laser light beam on the servo layer of the optical disc;
- a second laser light-source which emits a laser light beam on the recording layers of the optical disc;
- a first objective lens which focuses a laser light beam emitted by the first laser light-source;
- a second objective lens which focuses a laser light beam emitted by the second laser light-source;
- a first actuator which drives the first objective lens;
- a second actuator which drives the second objective lens;
- a first control unit which controls the first actuator; and
- a second control unit which controls the second actuator,
- wherein the first control unit controls the first actuator so that a position of a spot on the optical disc moves in a radial direction of the optical disc,
- wherein the second control unit controls the second actuator so that a position of a spot on the optical disc moves in a radial direction of the optical disc.

9. An optical disc device for recording information into an optical disc having a servo layer and a recording layer, comprising:
- a first laser light-source which emits a first laser light beam to illuminate the servo layer;
- a second laser light-source which emits a second laser light beam to illuminate the recording layer;
- a relay lens which controls convergence and divergence of the first laser light beam;
- an objective lens which focuses the first laser light beam onto the servo layer on the optical disc and focuses the second laser light beam onto the recording layer on the optical disc;
- a first actuator which drives the relay lens;
- a second actuator which drives the objective lens;
- a first control unit which controls the first actuator; and
- a second control unit which controls the second actuator,
- wherein, when recording of information onto the recording layer of the optical disc is performed, tracking control of the first actuator and tracking control of the second actuator are independent of each other.

* * * * *